United States Patent [19]

Simmons et al.

[11] Patent Number: 5,251,097
[45] Date of Patent: Oct. 5, 1993

[54] PACKAGING ARCHITECTURE FOR A HIGHLY PARALLEL MULTIPROCESSOR SYSTEM

[75] Inventors: Frederick J. Simmons, Neillsville; Steve S. Chen; Greg W. Pautsch, both of Chippewa Falls; Michael H. Rabska, Eau Claire; Dennis F. Girling, Cadott; Douglas C. Paffel, Stanley; Dan L. Massopust, Eau Claire; Lisa Heid, Eau Claire; Felix R. Lesmerises, Eau Claire; Christopher J. Sperry, Eau Claire; Edward C. Priest, Eau Claire, all of Wis.

[73] Assignee: Supercomputer Systems Limited Partnership, Eau Claire, Wis.

[21] Appl. No.: 536,395

[22] Filed: Jun. 11, 1990

[51] Int. Cl.⁵ .............. H02B 1/20; H05K 7/20
[52] U.S. Cl. .................. 361/687; 361/700; 361/694; 361/707

[58] Field of Search .......... 361/384, 385, 386, 388, 361/393, 407, 413; 364/200; 395/325, 425; 307/475

[56] References Cited

U.S. PATENT DOCUMENTS

| | | | |
|---|---|---|---|
| 4,964,035 | 10/1990 | Aoyama et al. | 364/200 |
| 5,006,961 | 4/1991 | Monico | 361/413 |
| 5,148,527 | 9/1992 | Basso et al. | 395/325 |

Primary Examiner—Bruce A. Reynolds
Assistant Examiner—Michael D. Switzer
Attorney, Agent, or Firm—Patterson & Keough

[57] ABSTRACT

The present invention includes methods and apparatus for creating a packaging architecture for a highly parallel multiprocessor system. The packaging architecture of the present invention can provide for distribution of power, cooling and interconnections at all levels of components in a highly parallel multiprocessor system, while maximizing the number of circuits per unit time within certain operational constraints of such a multiprocessor system.

13 Claims, 39 Drawing Sheets

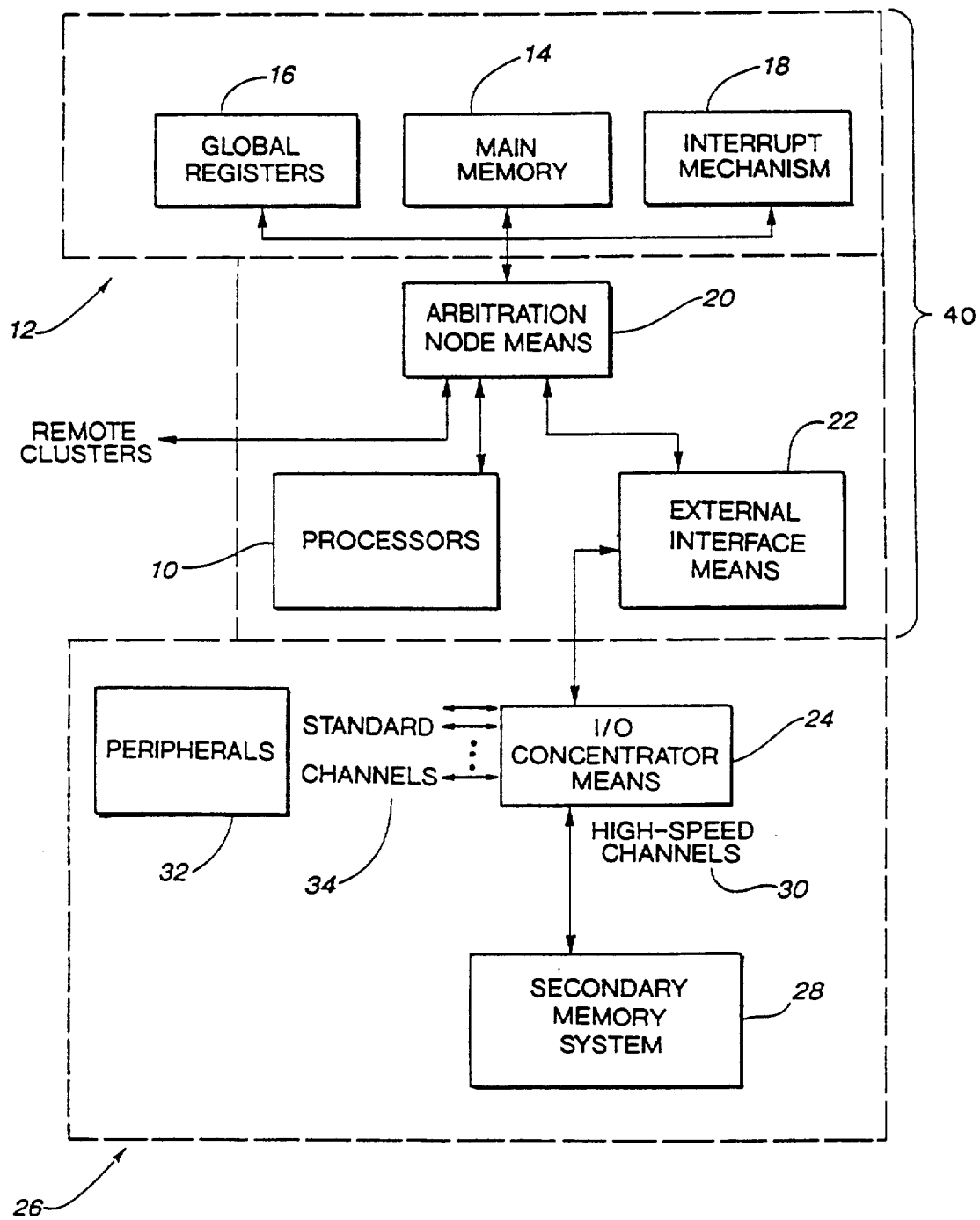

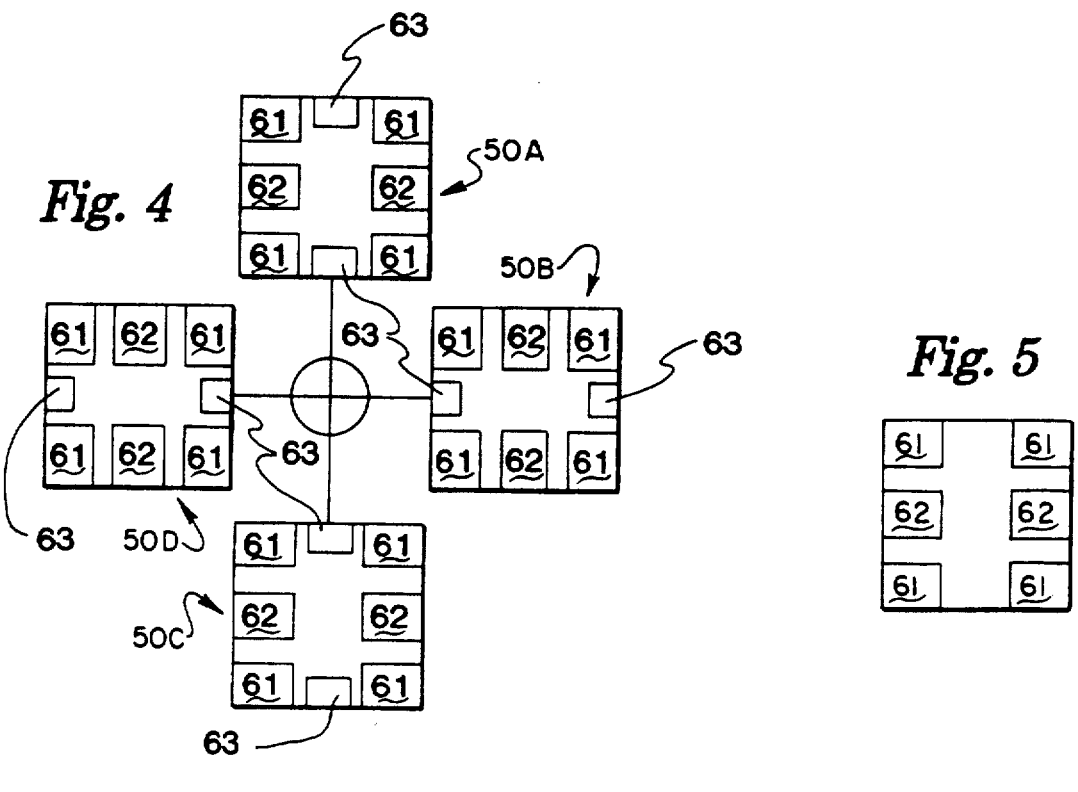
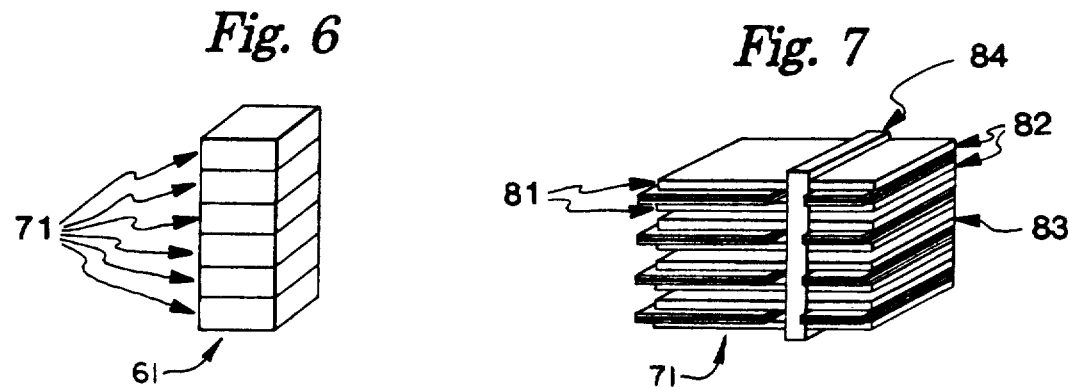
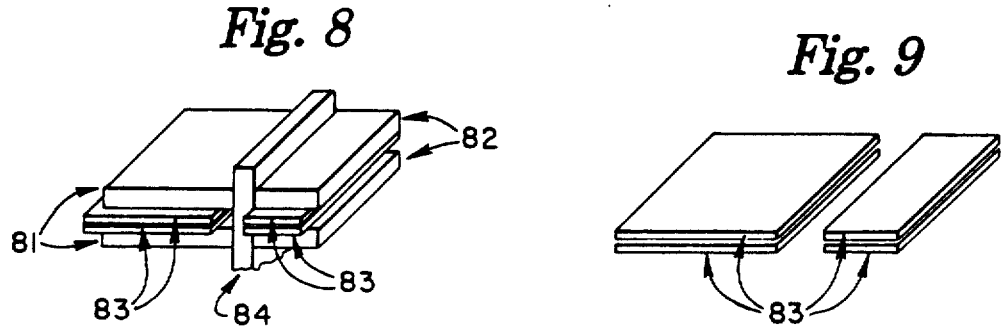

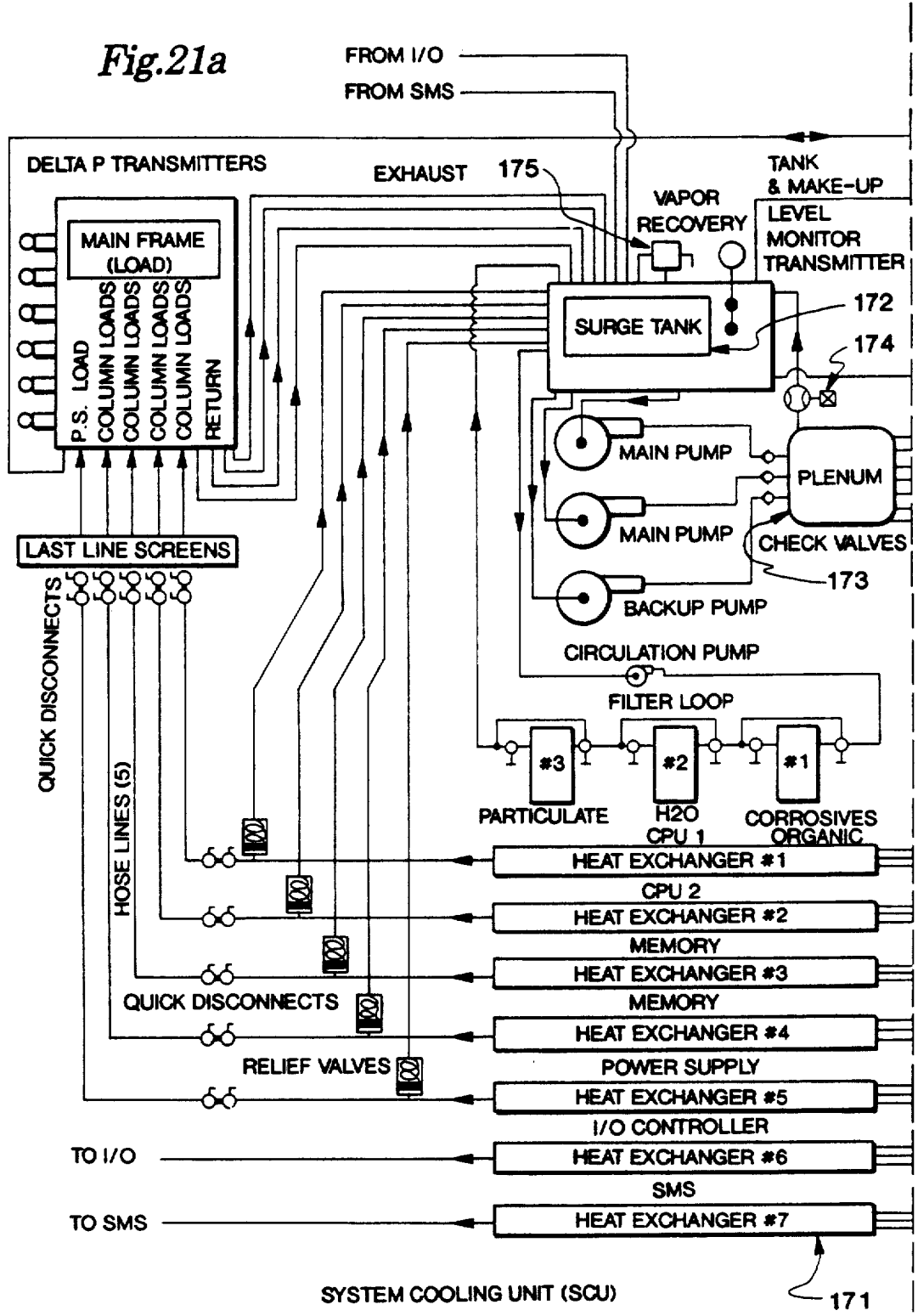

PACKAGING ARCHITECTURE FOR A HIGHLY PARALLEL MULTIPROCESSOR SYSTEM

RELATED APPLICATIONS

This application is related to an application filed in the U.S. Patent and Trademark Office on Dec. 29, 1989, entitled CLUSTER ARCHITECTURE FOR A HIGHLY PARALLEL SCALAR/VECTOR MULTIPROCESSOR SYSTEM, Ser. No. 07/459,083, now U.S. Pat. No. 5,197,130, and to co-pending application entitled CLOCK DISTRIBUTION APPARATUS AND PROCESSES PARTICULARLY USEFUL IN MULTIPROCESSOR SYSTEMS, Ser. No. 07/536,270 both of which are assigned to the assignee of the present invention, and both of which are hereby incorporated by reference.

TECHNICAL FIELD

This invention relates generally to the field of packaging and interconnection techniques for computer processing systems. More particularly, the present invention relates to methods and apparatus for creating a packaging architecture for a highly parallel multiprocessor system that provides for distribution of power, cooling and interconnections at all levels of components in a highly parallel multiprocessor system, while increasing the number of circuits per unit time that may be included in such a multiprocessor system.

BACKGROUND ART

Various high-speed computer processing systems, sometimes referred to as supercomputers, have been developed to solve a variety of computationally intensive applications, such as weather modeling, structural analysis, fluid dynamics, computational physics, nuclear engineering, realtime simulation, signal processing, etc. The overall design or architectures for such present supercomputers can be generally classified into one of two broad categories: minimally parallel processing systems and massively parallel processing systems.

The minimally parallel class of supercomputers includes both uniprocessors and shared memory multiprocessors. A uniprocessor is a very high-speed processor that utilizes multiple functional elements, vector processing, pipeline and look-ahead techniques to increase the computational speed of the single processor. Shared-memory multiprocessors are comprised of a small number of high-speed processors (typically two, four or eight) that are lightly-coupled to each other and to a common shared-memory using either a bus-connected or direct-connected architecture.

At the opposite end of the spectrum, the massively parallel class of supercomputers includes both array processors and distributed-memory multicomputers. Array processors generally consist of a very large array of single-bit or small processors that operate in a single-instruction-multiple-data (SIMD) mode, as used for example in signal or image processing. Distributed-memory multicomputers also have a very large number of computers (typically 1024 or more) that are loosely-coupled together using a variety of connection topologies such as hypercube, ring, butterfly switch and hypertrees to pass messages and data between the computers in a multiple-instruction-multiple-data (MIMD) mode.

Because of the inherent limitations of the present architectures for minimally parallel and massively parallel supercomputers, such computer processing systems are unable to achieve significantly increased processing speeds and problem solving spaces over current systems. The related application identified above sets forth a new cluster architecture for interconnecting parallel processors and associated resources that allows the speed and coordination associated with the current design of minimally parallel multiprocessor systems to be extended to larger numbers of processors, while also resolving some of the synchronization problems which are associated with massively parallel multicomputer systems. This range between minimally parallel and massively parallel systems will be referred to as highly parallel computer processing systems and can include multiprocessor systems having sixteen to 1024 processors. The cluster architecture described in the related application provides for one or more clusters of tightly-coupled, high-speed processors capable of both vector and scalar parallel processing that can symmetrically access shared resources associated with the cluster, as well as shared resources associated with other clusters.

Just as the traditional system architectures were ill-suited for solving the problems associated with highly parallel multiprocessor systems, so too are the traditional packaging architectures. As used within the present invention, the term packaging refers to the physical organization of the various components of a computer processing system. There are four basic functions that packaging performs: power distribution, signal distribution, heat dissipation and component protection. An overview of the various considerations involved in microelectronic packaging and summary of the present state of the art is presented in R. Tummala and E. Rymaszewski, *Microelectronics Packaging Handbook*, pp. 1–63 and pp. 1087–1121 (specifically discussing packaging for large general-purpose computers and supercomputers) (1989).

Regardless of the system architecture that is chosen for a computer processing system, there are certain physical and operational constraints that have effectively limited the types of packaging architectures used for physically packaging supercomputers. Perhaps the most important of these limitation is the speed at which signals can travel between circuitry elements or components of the system. The limitation that signals cannot travel faster than the speed of light (and usually at some reduced percentage of the speed of light) limits the physical distance that a signal can travel in a finite amount of time. In supercomputers operating at clock speeds on the order of 1 to 10 nanoseconds, this distance is between 1 and 20 feet. In an attempt to place most of the physical components within this physical limit, prior art supercomputer packaging architectures organized the components of the system in unique arrangements. The most notable of these packaging architectures is the Cray hexagonal format in which the circuit elements extend radially outward from a central backplane structure as shown, for example, in U.S. Pat. No. 4,466,255.

One of the other important physical limitations in supercomputer packaging architectures is heat dissipation. In general, the faster the electronic components in a computer system are operated, the more energy they require and the more power they dissipate. In a typical supercomputer, the power dissipated ranges anywhere between 10 and 100 watts/cm$^2$, depending upon the type of circuitry used (i.e., bipolar, CMOS, GaAs), the physical arrangement of the circuitry and the clock speed at which it is operated. To handle the power dissipated by the very large number of very fast electrical components, prior art packaging architectures employed a number of cooling techniques. In the Cray Y-MP supercomputers, formed convection flow cooling is used over the entire system, as shown, for example, in U.S. Pat. Nos. 4,120,021, 4,466,255, 4,590,538, and 4,628,407. In the now abandoned ETA supercomputers, a portion of the electronic components were immersed in a liquid nitrogen bath.

Another packaging consideration relates to maintenance and component replacement for failed components. Generally, most present supercomputer architectures incorporate traditional packaging schemes which utilize pluggable circuit boards and a backplane format. For example, the Cray packaging scheme uses generally circular backplane arrangement for holding stacks of larger circuit boards, as shown, for example, in U.S. Pat. Nos. 4,700,996 and 4,514,784. Digital Equipment Corp. and IBM Corp. have packaging schemes which utilize smaller circuit board modules in planar modular packaging techniques in a frame structure. Similar types of small circuit boards and planar modular packaging techniques are used in the Hitachi and Fujitsu supercomputers.

While the present packaging architectures for supercomputers have allowed such systems to achieve peak performances in the range of 0.2 to 2.4 GFLOPS (billion floating point operations per second), it would be advantageous to provide a method and apparatus for creating a packaging architecture for a highly parallel multiprocessor system that is capable of providing a distribution of power, cooling and interconnections at all levels of components in a highly parallel multiprocessor system, while increasing the number of circuits per unit time of such a multiprocessor system. More importantly, it would be advantageous to provide for a packaging architecture that is capable of effectively connecting between sixteen and 1024 processors together in a highly parallel cluster architecture to achieve peak performance speeds in the range of 10 to 1,000 GFLOPS.

SUMMARY OF THE INVENTION

The present invention includes methods and apparatus for creating a packaging architecture for a highly parallel multiprocessor system. The packaging architecture of the present invention can provide for distribution of power, cooling and interconnections at all levels of components in a highly parallel multiprocessor system, while maximizing the number of circuits per unit time of such a multiprocessor system. The theory behind the packaging architecture of the present invention is to maximize the number of circuits per unit time in a symmetrical architecture that supports replacement of generally three-dimensional module assemblies. This is accomplished by minimizing signal propagation distances, improving cooling techniques as needed due to increased circuit and power densities, etc.

This packaging architecture for a multiprocessor cluster for a highly parallel computer processing system provides shared resource for storing and retrieving data and control information, a plurality of processors capable of parallel processing, and one or more arbitration nodes operably connected to processors and shared resources to symmetrically interconnect processors with shared resources.

The packaging architecture includes a plurality of modular bricks for packaging a portion of electronic circuitry for the computer processing system. Each brick is comprised of (1) a switching circuit for controlling the routing of signals to and from the brick means operably connected to a plurality of spaced apart first substrates, (2) a functional circuit means for performing functional operations operably connected to a plurality of spaced apart second substrates (each of the second substrates being associated with one of the first substrates), (3) a transformation board means intersecting each of said plurality of first and second substrates for providing a plurality of signal paths to interconnect the switching circuit means and the functional circuit means, and (4) a plurality of columns, each column comprised of two or more bricks operably connected together.

The present invention provides a circuitry packaging for a computer processing system comprised of a first and second substrate, each spaced apart from each other, in generally planar relationship. The first substrate area has a plurality of circuitry elements and a plurality of backplane external interconnections operably connected to said first substrate area as well as a means for providing a plurality of signal paths to and from the circuitry elements and the backplane external interconnections. The second substrate area has a plurality of circuitry elements operably connected to the second substrate area as well as a means for providing a plurality of signal paths to and from the circuitry elements. The transformation board intersects the first and second substrates to provide a plurality of signal paths for interconnecting the two such that the intersection defines a planar boundary between the first and second substrate area and the only connections to and from the circuitry elements on the second substrate areas are via these signal paths on the transformation board to signal paths and backplane external interconnections on first substrate areas.

The packaging architecture of the present invention also provides for mounting a plurality of electronic circuit chips. This includes a substrate means for providing signal paths and power connection for electronic circuit chips and a plurality of interposers positioned between a unique plurality of circuit chips and substrate means, mounted by an areal surface technique.

The present invention provides a packaging architecture for a multiprocessor computer system that uses DC to DC conversion and controlled impedance both on the power level and on the signal level.

The present invention also provides a cooling system for a highly parallel multiprocessor system containing a system refrigeration unit (SRU) means for providing a high pressure coolant liquid and a system cooling unit (SCU) means for providing a coolant liquid to the multiprocessor system. The SCU means includes a pump means for moving liquid coolant through the SCU means, one or more heat exchangers operably connected to a pump means and the SRU means for providing a thermal exchange between the liquid coolant of the SCU and the high pressure liquid coolant of the SRU. There exists a plurality of columns, each column having one or more channels for transferring liquid coolant to and from one or more bricks, each brick containing circuit elements on a plurality of spaced apart substrates and one or more impingement plate means operably connected to one of said channels and interspaced between said substrates, each impingement plate means having a plurality of impingement holes on at least one side of said impingement plate means for impinging said liquid coolant on said circuit element associated with said impingement holes; and one or more power supplies, each power supply having one or more coolant paths for flowing said liquid coolant over said power supply.

Accordingly, it is an objective of the present invention to provide a packaging architecture which maximizes the number of circuits per unit time.

Another objective of the present invention is to provide a packaging architecture capable of supplying power to circuitry packaged to maximize the number of circuits per unit time.

Another objective of the present invention is to provide a packaging architecture capable of cooling circuitry packaged to maximize the number of circuits per unit time.

Another objective of the present invention is to provide a packaging architecture for a highly parallel multiprocessor system that is capable of physically supporting the connection of sixteen to 1024 high-speed processors in a highly parallel architecture that may achieve peak performance speeds in the range of 10 to 1,000 GFLOPS.

Another objective of the present invention is to provide a packaging architecture for a multiprocessor cluster of tightly-coupled, high-speed processors capable of both vector and scalar parallel processing that can symmetrically access shared resources, both in the same cluster and in different clusters.

These and other objectives of the present invention will become apparent with reference to the drawings, the detailed description of the preferred embodiment and the appended claims.

DESCRIPTION OF THE DRAWINGS

FIG. 1 is a block diagram of a single multiprocessor cluster of the preferred embodiment of the present invention.

FIG. 4 is a top plan diagram thereof showing system of clusters.

FIG. 5 is a top plan diagram thereof showing a single cluster.

FIG. 6 is a pictorial diagram thereof showing a column of bricks.

FIG. 7 is a pictorial diagram thereof showing a brick.

FIG. 8 is a pictorial diagram thereof showing a module.

FIG. 9 is a pictorial diagram thereof showing a PC substrate.

DESCRIPTION OF THE PREFERRED EMBODIMENTS

Figure 2A:
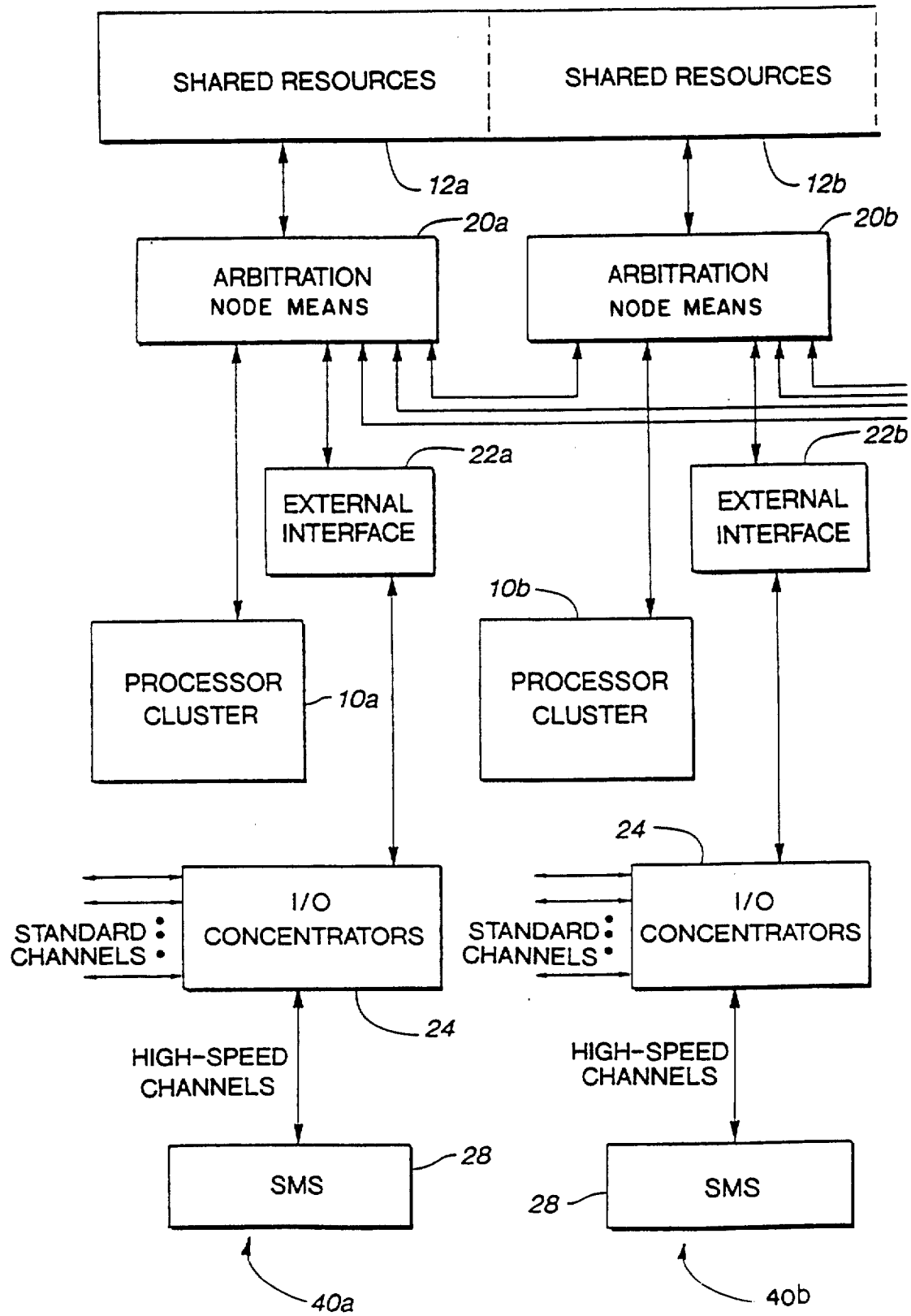
FIGS. 2a and 2b are block diagrams of a four cluster implementation of the preferred embodiment of the present invention.

Although it will be understood that the packaging architecture of the present invention is capable of being implemented on any number of multiprocessor systems, the preferred embodiment of a multiprocessor cluster system is briefly presented to provide a reference for understanding the present invention. For a more detailed description of the preferred embodiment of the multiprocessor cluster system, reference is made to the related application, entitled CLUSTER ARCHITECTURE FOR A HIGHLY PARALLEL SCALAR/VECTOR MULTIPROCESSOR SYSTEM, Ser. No. 07/459,083.

Cluster Description

Referring now to FIG. 1, a single multiprocessor cluster of the preferred embodiment of the multiprocessor cluster system according to the present invention is shown having a plurality of high-speed processors 10 sharing a large set of shared resources 12 (e.g., main memory 14, global registers 16, and interrupt mechanisms 18). In this preferred embodiment, the processors 10 are capable of both vector and scalar parallel processing and are connected to the shared resources 12 through an arbitration node means 20. The processors 10 are also connected through the arbitration node means 20 and a plurality of external interface means 22 and I/O concentrator means 24 to a variety of external data sources 26. The external data sources 26 may include a secondary memory system (SMS) 28 linked to the I/O concentrator means 24 via a high speed channel 30. The external data sources 26 may also include a variety of other peripheral devices and interfaces 32 linked to the I/O concentrator means 24 via one or more standard channels 34. The peripheral device and interfaces 32 may include disk storage systems, tape storage systems, terminals and workstations, printers, and communication networks.

Figure 2B:
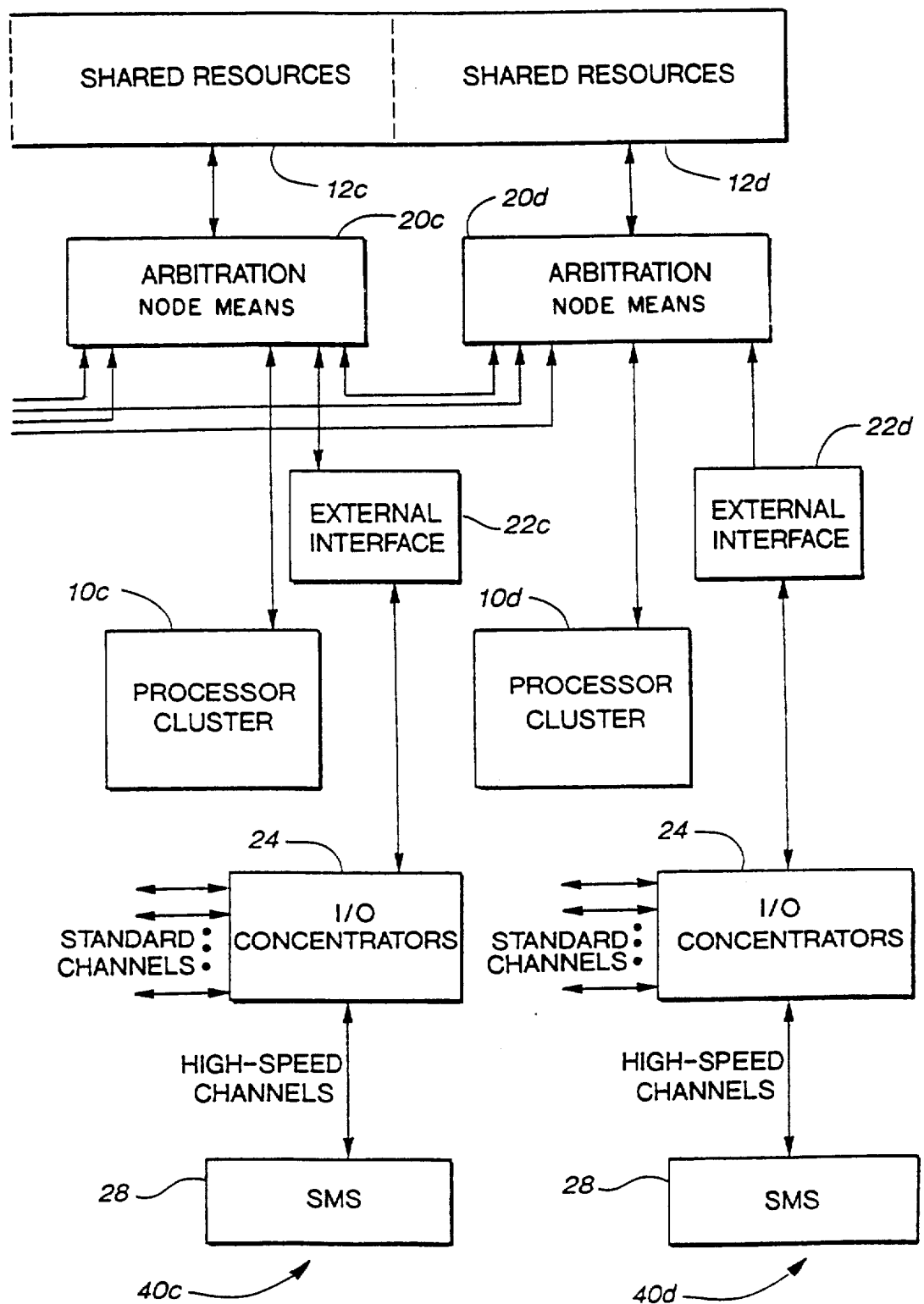

Referring now to FIG. 2, a block diagram of a four cluster version of a multiprocessor system is shown. Each of the clusters 40a, 40b, 40c and 40d physically has its own set of processors 10a, 10b), 10c and 10d, shared resources 12a, 12b, 12c and 12d, and external interface means 22a, 22b, 22c and 22d that are associated with that cluster. The clusters 40a, 40b, 40c and 40d are interconnected through a remote cluster adapter means 42 (not shown) that is an integral part of each arbitration node means 20a, 20b, 20c and 20d as explained in greater detail in the related application on the CLUSTER ARCHITECTURE. Although the clusters 40a, 40b, 40c and 40d are physically separated, the logical organization of the clusters and the physical interconnection through the remote cluster adapter means 42 (not shown) enables the desired symmetrical access to all of the shared resources 12a, 12b, 12c and 12d across all of the clusters 40a, 40b, 40c and 40d.

Figure 3:
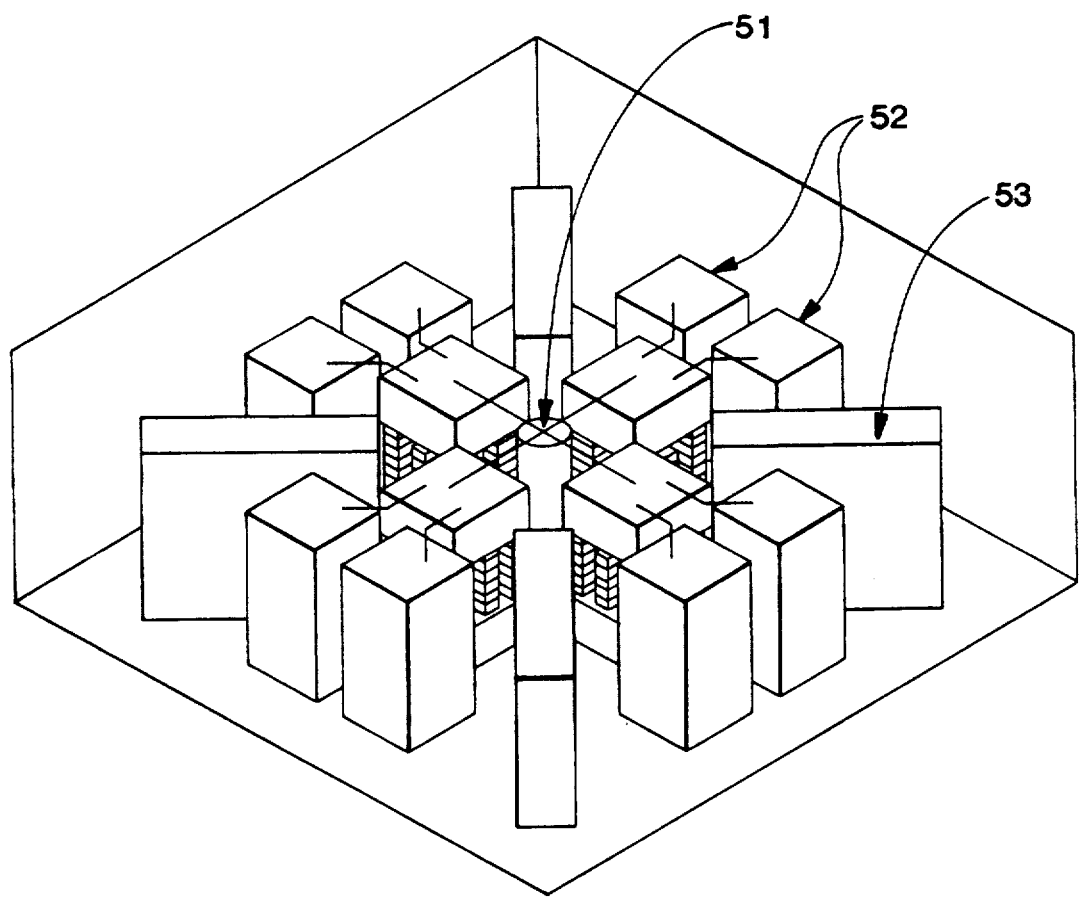
FIG. 3 is a schematic pictorial representation of a four cluster version of the packaging of the present invention.

Referring now to FIG. 3, the packaging architecture for the four-cluster version of the present invention will be described, as it concerns the physical positions of cluster element cabinets within a computer room. One of the primary considerations in positioning the elements of the cluster, i.e., the mainframe 50, the clock tower 51, the Input/Output Concentrator (IOC) 52, and the Secondary Memory System (SMS) 53, is the distance between the elements. Timing skews in the operation of pipelined multiprocessor systems show up as a result of the distance between elements of the system. Depending upon the clock speed of the multiprocessor system, there is a finite distance beyond which it is not possible to predictably resynchronize the data from any one point in the system to any other point. The architecture of the present invention allows the maximum distance between any cabinet to be less than 15 feet, which avoids the possibility of introducing timing skews. It should be noted that the Inter-box Communication Boards (IBC) (FIG. 4) that are described later are one solution of how to stretch that distance.

Referring to FIGS. 2 and 3, the clock distribution unit 51 for the processor 10 in the mainframe 50 is the clock tower for the optical/electrical clock system. The I/O concentrator means 24, located within the IOC 52, supports eight standard I/O channels (HiPPI or fiber optic). The I/O concentrator means 24 also has an interface to main memory 14 through the arbitration node means 20. The IOC 52 also has a connection to the SMS 28.

The SMS 53 is housed in its own stand-alone cabinet and provides a very large backing store for main memory. The SMS 53 and the IOC 52 can be one or two boxes. The SMS 53 is capable of transferring data in and out of main memory, and in and out of peripheral devices via the high-speed channels from the I/O system.

Referring now to FIGS. 4 through 9, schematic representations for the various components of the packaging architecture for a highly parallel multiprocessor system are shown. FIG. 5 shows a single mainframe. FIG. 4 shows the preferred embodiment of the arrangement of the four mainframes 50A, 50B, 50C, and 50D. Each mainframe 50 contains four memory columns 61 located at each of the comers of the mainframe 50 and two processor columns 62 located midway between the memory columns 61 along parallel sides of the mainframe 50. Each of the mainframes 50 also contains a set of Inter-Box Communication Boards (IBC) 63 for Interconnecting among the mainframes 50A, 50B, 50C, and 50D and between the mainframes 50 and the IOC 52 and SMS 30 (not shown). The IBC 63 provides for an asynchronous box-to-box data path at a length greater than that permitted by the cluster synchronous data rate without loss of data bandwidth. The operation of the IBCs 63 is explained in greater detail hereinafter.

Referring now to FIG. 6, a three-dimensional schematic representation of a column having a plurality of bricks 71 is shown. For the memory column 61, each column is comprised of six memory bricks. For the two processor columns 62, the columns are comprised of four processor bricks 71 each, along with a brick 71 associated with either the Node Remote Cluster Adapter (NRCA) or the Memory Remote Cluster Adapter (MRCA).

Referring now to FIG. 7, a schematic isometric representation of a brick 71 is shown. The brick 71 is comprised of four module assemblies, one of which is shown in FIG. 8. Each module assembly consists of a pair of main module substrates 81 and a pair of mini module substrates 82, each substrate of each pair having associated with it a laminated power substrate (LPS) 83. The main module substrate 81 and mini module substrate 83 are operably interconnected by a vertical transformation board (VTB) means 84 through a VTB connector means (not shown). The VTB means 84 is a multi-layer substrate for intrabrick routing of control and data signals among the circuitry associated with both the main module 81 and the mini module 82 without requiring that the substrates be interconnected by means of a back-plane interconnection. Inter-brick communications are accomplished by the back-plane interconnection which interfaces the back-plane (not shown) with the mini module 82. Alternately, and if connection space allows, some intra-brick connections could be made through the back-plane.

In the preferred embodiment as shovm in FIGS. 7 and 8, the substrates within mainframe 50 are multi-layer substrates (MLS) fabricated from either organic or inorganic materials. As shovm in FIG. 8, main module processor substrate 81, all mini module substrates 82, and VTB 84 are inorganic while main module memory substrate 81 is organic. FIG. 9 shows the LPSs 83 separate from the rest module assembly.

Figure 11:
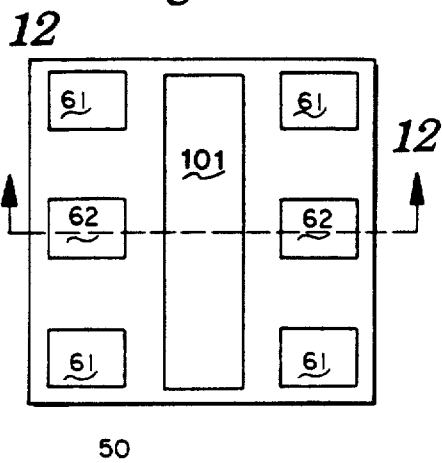
FIG. 11 is a sectional diagram thereof taken along line 11—11 in FIG. 10.
Figure 12:
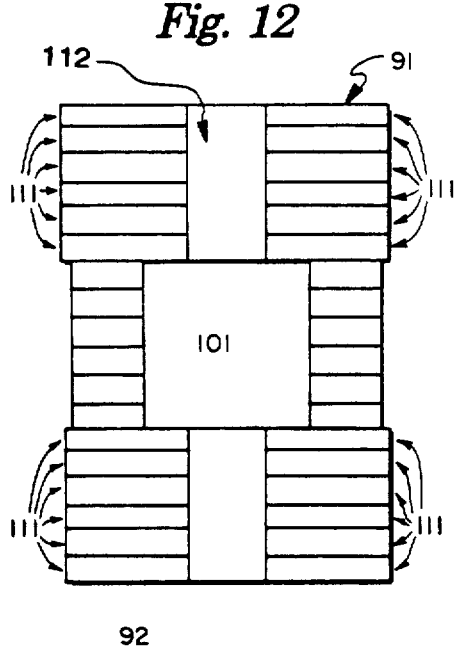
FIG. 12 is a sectional diagram thereof taken along line 12—12 in FIG. 11.
Figure 10:
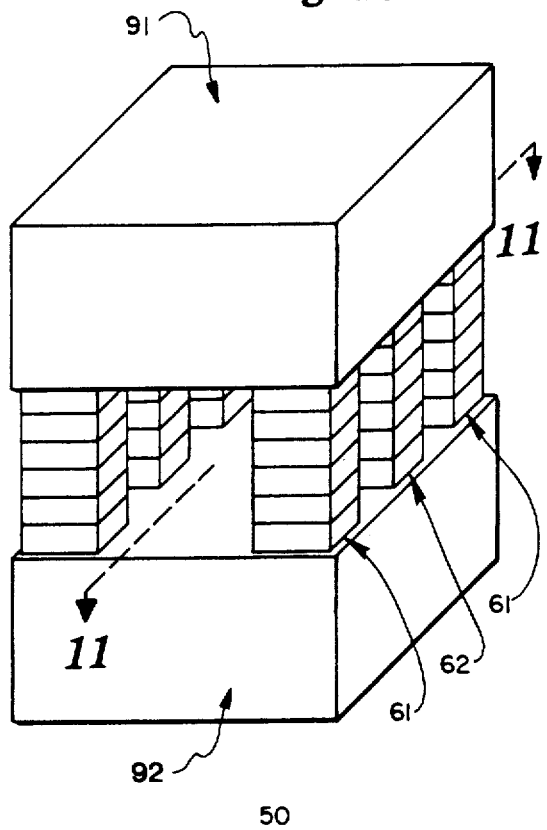
FIG. 10 is a pictorial diagram thereof showing a cluster.

Referring now to FIGS. 10 through 12, the physical organization of a mainframe 50 is shown. FIG. 10 is a perspective view of a single mainframe 50. In this embodiment of the present invention, the mainframe 50 includes two power supply housings 91 and 92, operably located on the top and bottom of the mainframe 50, respectively.

FIG. 11 shows a horizontal cross section of the mainframe 50, taken along line 11—11 as shown in FIG. 10. A wire mat volume 101 is generally defined as the space between the columns 61, 62. FIG. 12 shows a vertical cross section of a single mainframe 50, taken along line 12—12 as shown in FIG. 11. As shown in FIG. 12, the power supply housings 91 and 92 are each respectively comprised of a plurality of individual DC to DC power supply converters 111. In this embodiment, locations for six columns and five rows of DC to DC power supply converters 111 are included at opposite sides in both the top and bottom power supply housings 91 and 92. This allows for in excess of one hundred power supply converters 111 to be located in the mainframe 50.

As seen in both FIGS. 11 and 12, a wire mat volume 101 is defined horizontally by the organization of the columns 61, 62, and vertically by the placement of the power supply housings 91 and 92. In the preferred embodiment, the wire mat volume is filled with a liquid coolant as described in further detail in conjunction with the cooling section described later. In this embodiment, the liquid coolant is also allowed to flow into the power supply cooling volume 112 as will also be later explained in greater detail.

Figure 13:
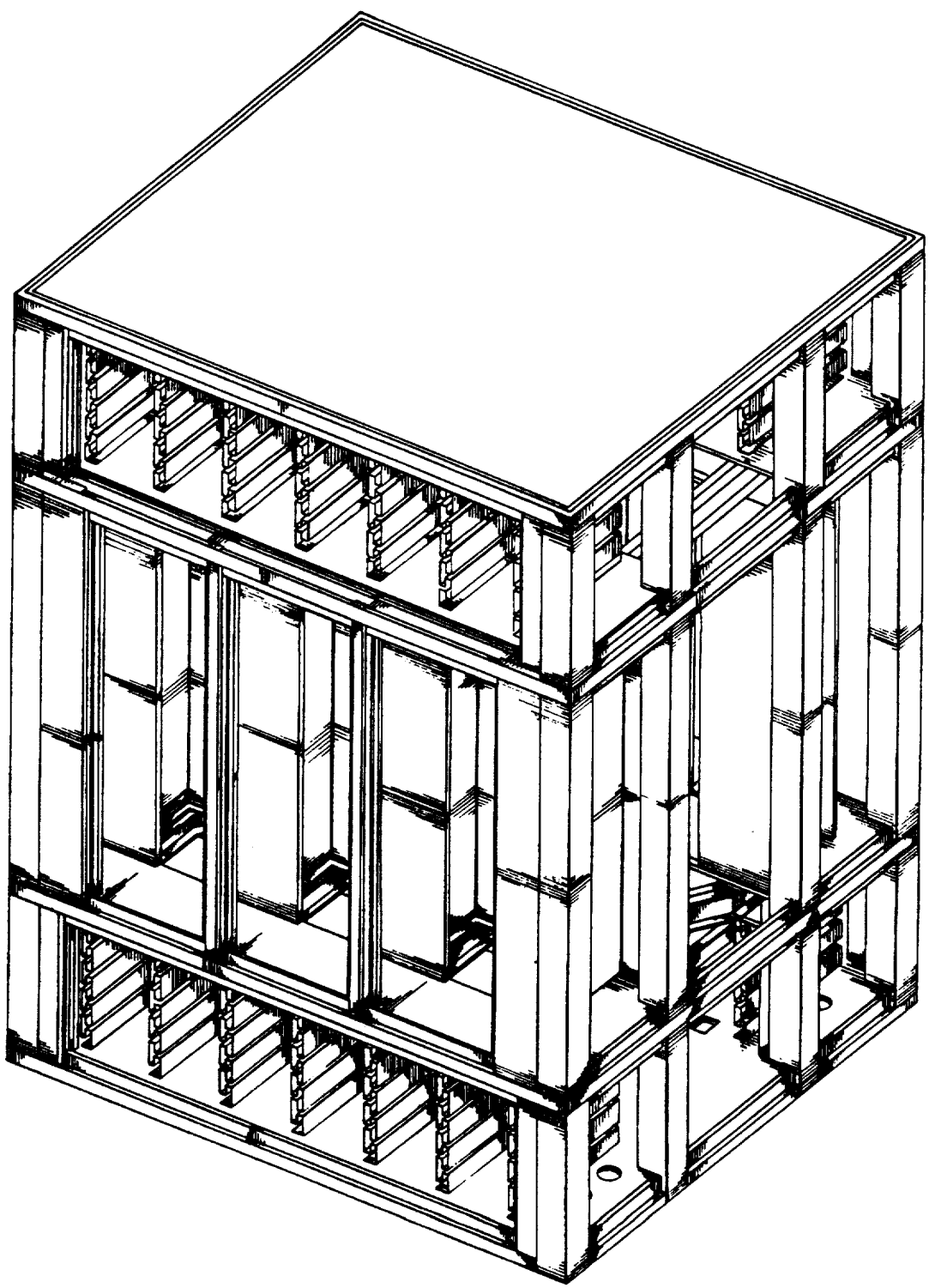
FIG. 13 is an isometric view thereof showing framework assembly.
Figure 14:
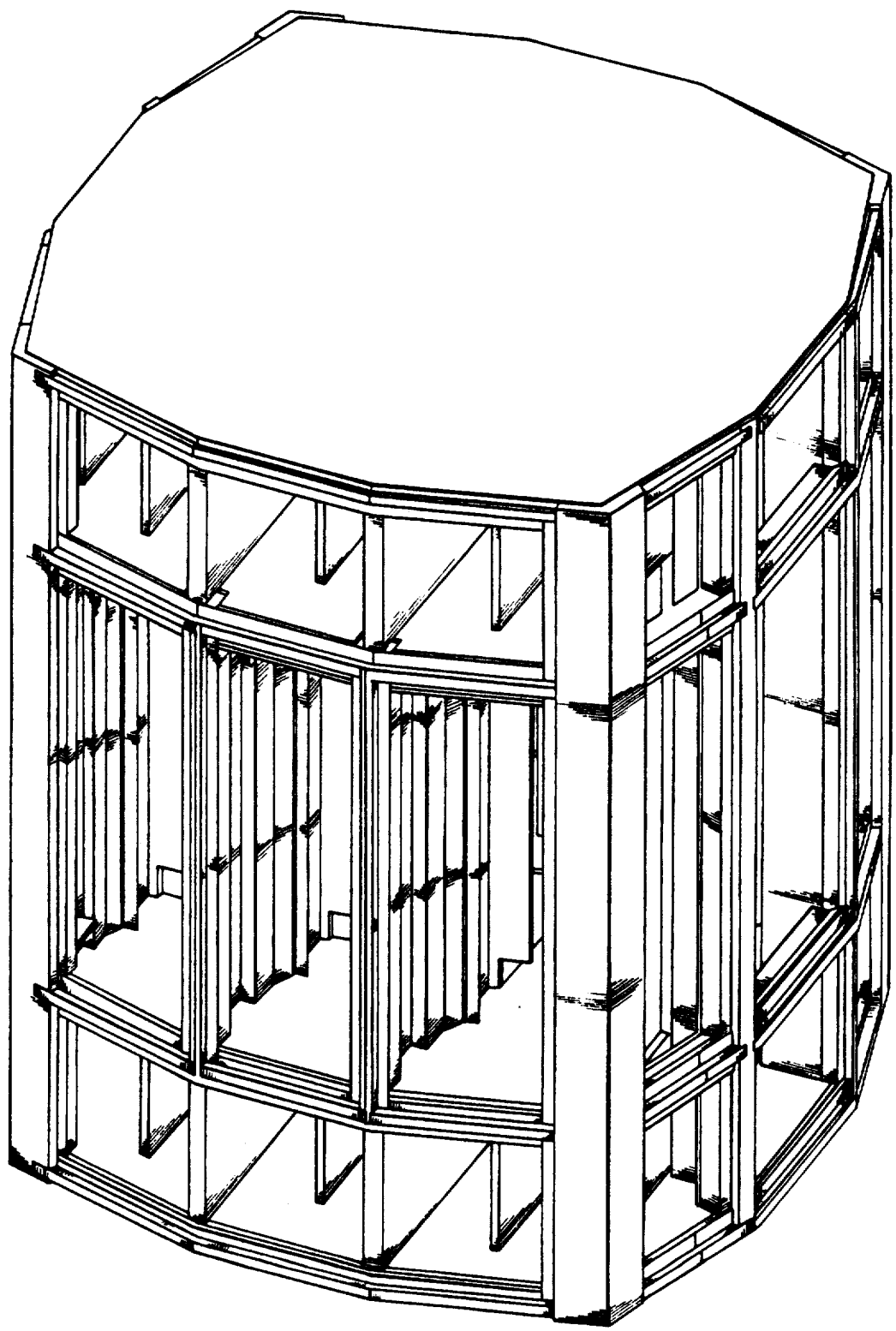
FIG. 14 is an alternative embodiment of the exterior frame.

FIGS. 13 and 14 show two alternate embodiments for the exterior frame for the cluster packaging of the present invention.

Power Distribution

Figure 15:
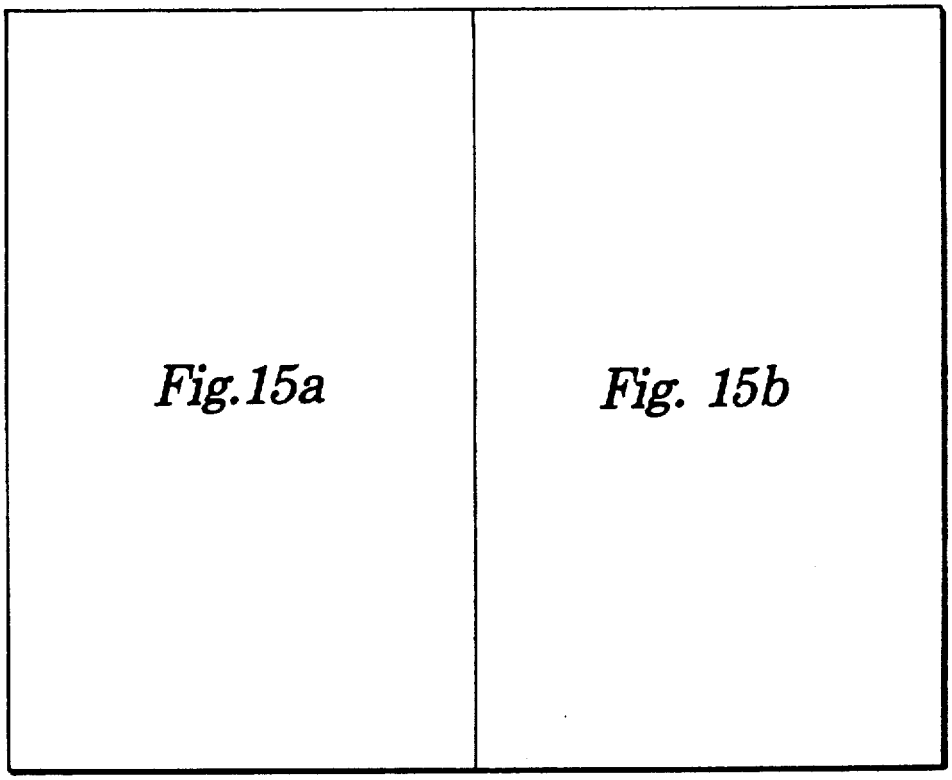
FIGS. 15a and 15b a power distribution diagram.
Figure 15A:
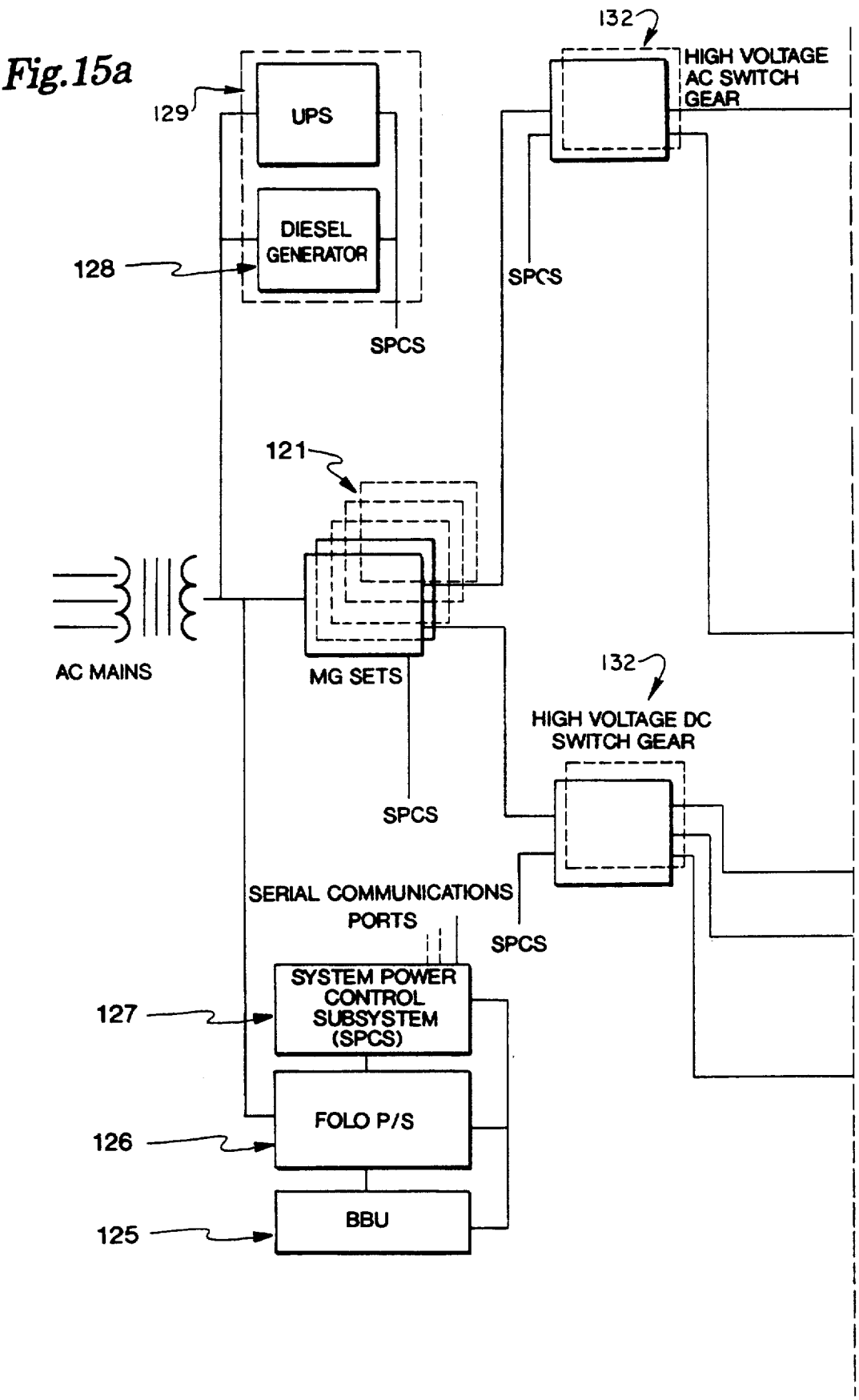
Figure 15B:
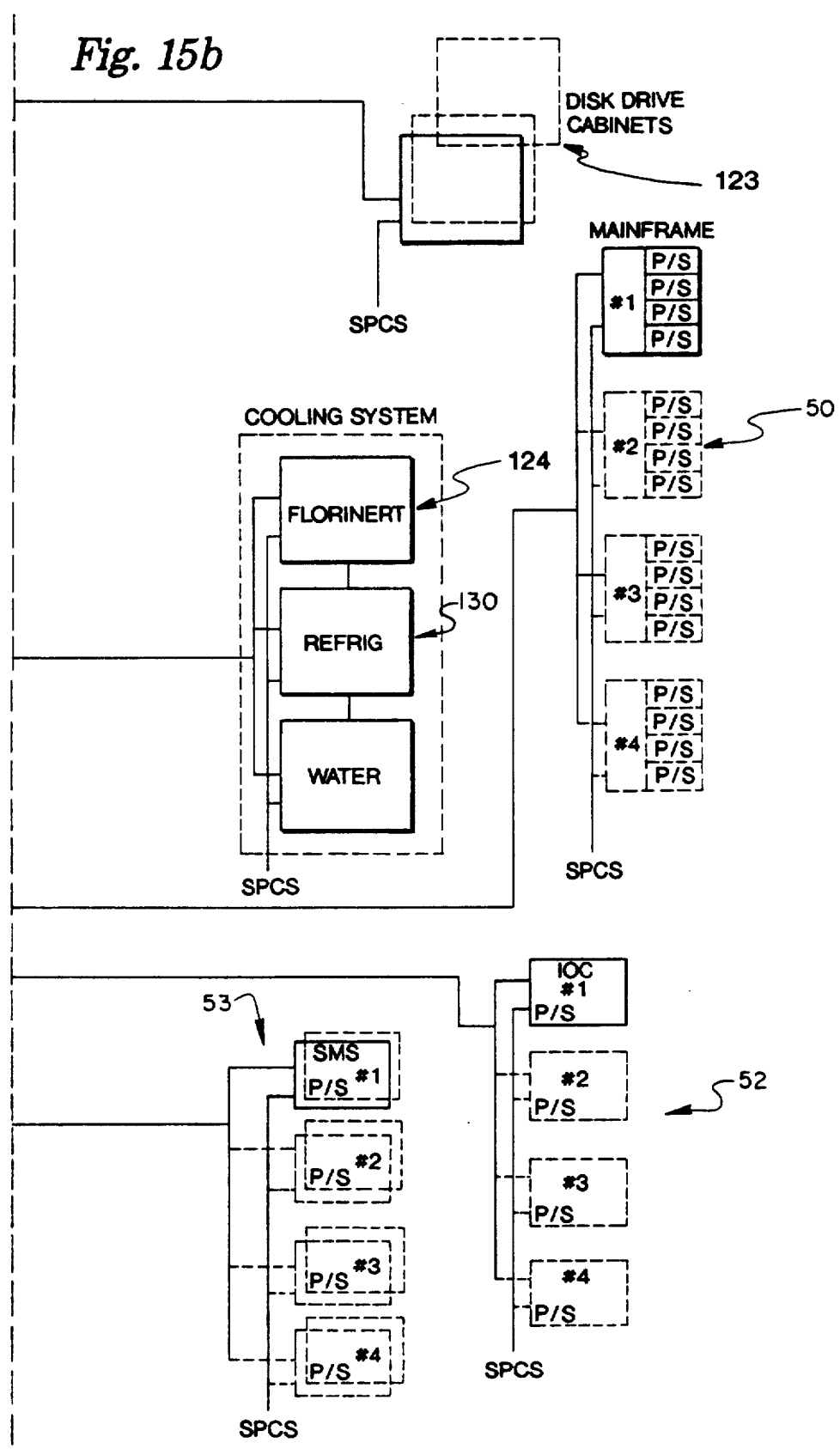

Referring now to FIG. 15, a converter means 121 is used to supply both an AC and DC output. The converter supplies high voltage DC to the switching power supplies on the mainframe 50, IOC 52, and the SMS. 480 VAC, 3-phase, 60 Hz power is supplied from the converter to the disk drives 123 via an under floor step-down transformer. The transformer reduces the voltage to 380 VAC. The System Cooling Unit (SCU) 124 and the System Refrigeration Unit (SRU) 130 receive 480 VAC, 3-phase, 60 Hz power directly from the converter. Using converter means 121 provides the advantage of isolation from line input and allows a one-half second ridethrough to ensure constant voltage input during short line disturbances. At least two converters means (N and N+1) can be used in the present invention, with one being a backup converter.

A battery back-up unit (BBU) 125 supplies power to the FOLO (first-on, last-off) power supply 126. The FOLO unit is the power supply for the power control sub-system 127 that monitors the environment and power/cooling distribution in the present invention. An uninterruptable power supply (UPS) means 129 is used to provide a sufficient carry-over to allow a diesel generator 128 to power up in the event there is a power outage.

As shown in FIG. 10, the power supply housing means 91 and 92 in the preferred embodiment are located on the top and bottom of the cluster (rather than only the bottom) to decrease power losses on the Low Voltage Direct Current (LVDC) bus by decreasing the distance from the power supplies to the bricks. Better regulation and control are maintained on the LVDC busses yielding improved noise immunity for logic and memory.

The improved packaging density of the DC to DC power supplies provides for a smaller mainframe size which enables a more compact system configuration. The system requirements for low attenuation and clock skew are enhanced by a more compact system configuration.

All DC busses are designed as controlled impedance transmission lines. Controlled impedance allows the DC-to-DC power supplies to respond to load changes more readily.

Figure 16:
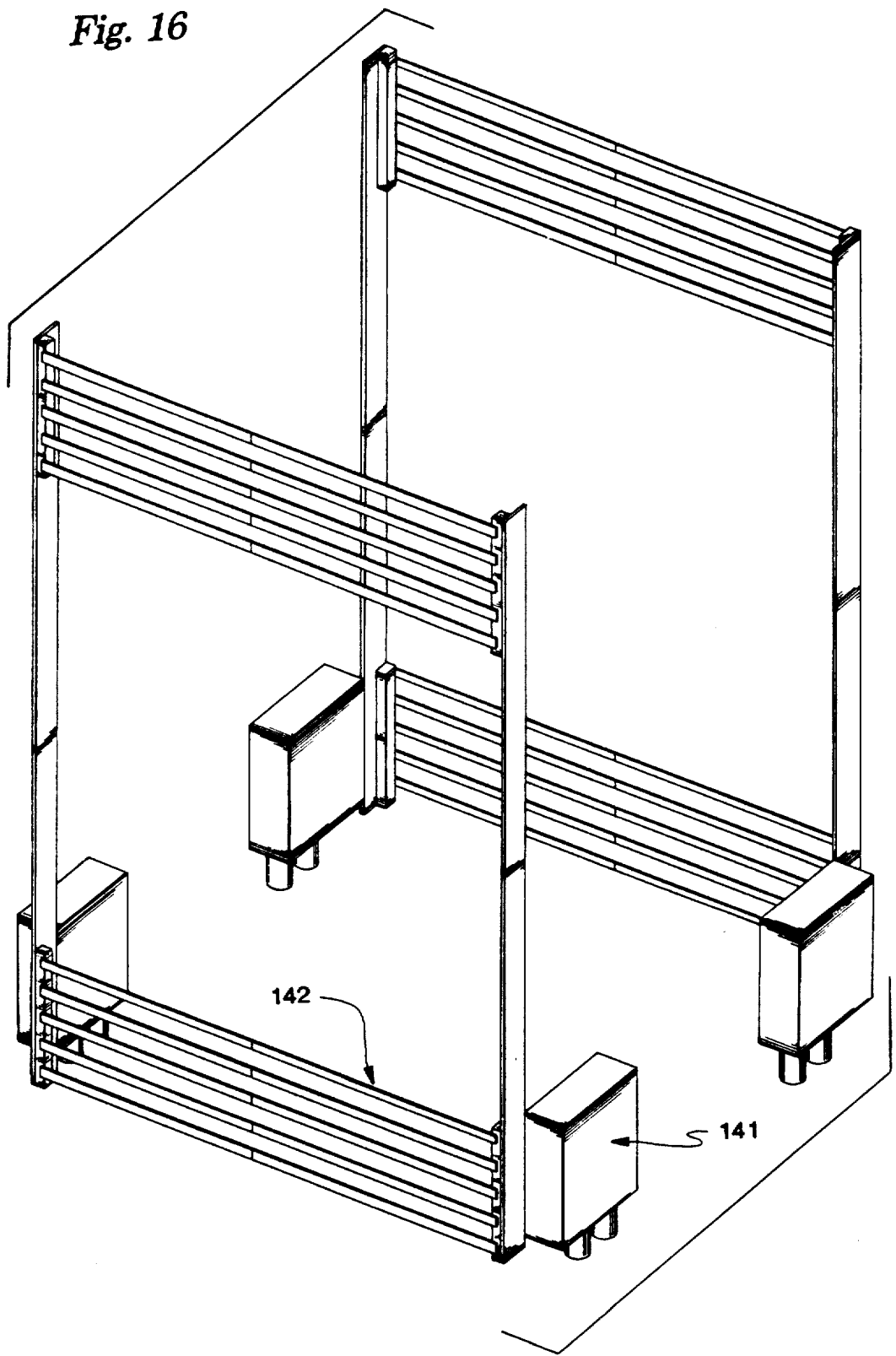
FIG. 16 is an exploded isometric view thereof showing HVDC electrical bussing.

Referring now to FIG. 16, the High Voltage Direct Current (HVDC) input to the electro magnetic interference (EMI) filter box 141 and the HVDC bus assemblies 142 for the top and bottom power supply housing means 91 and 92 are shown. Voltage is brought in to the filter box connector 141 as plus and minus 175 volts for a total voltage difference on the HVDC bus of 350 volts DC.

Figure 17:
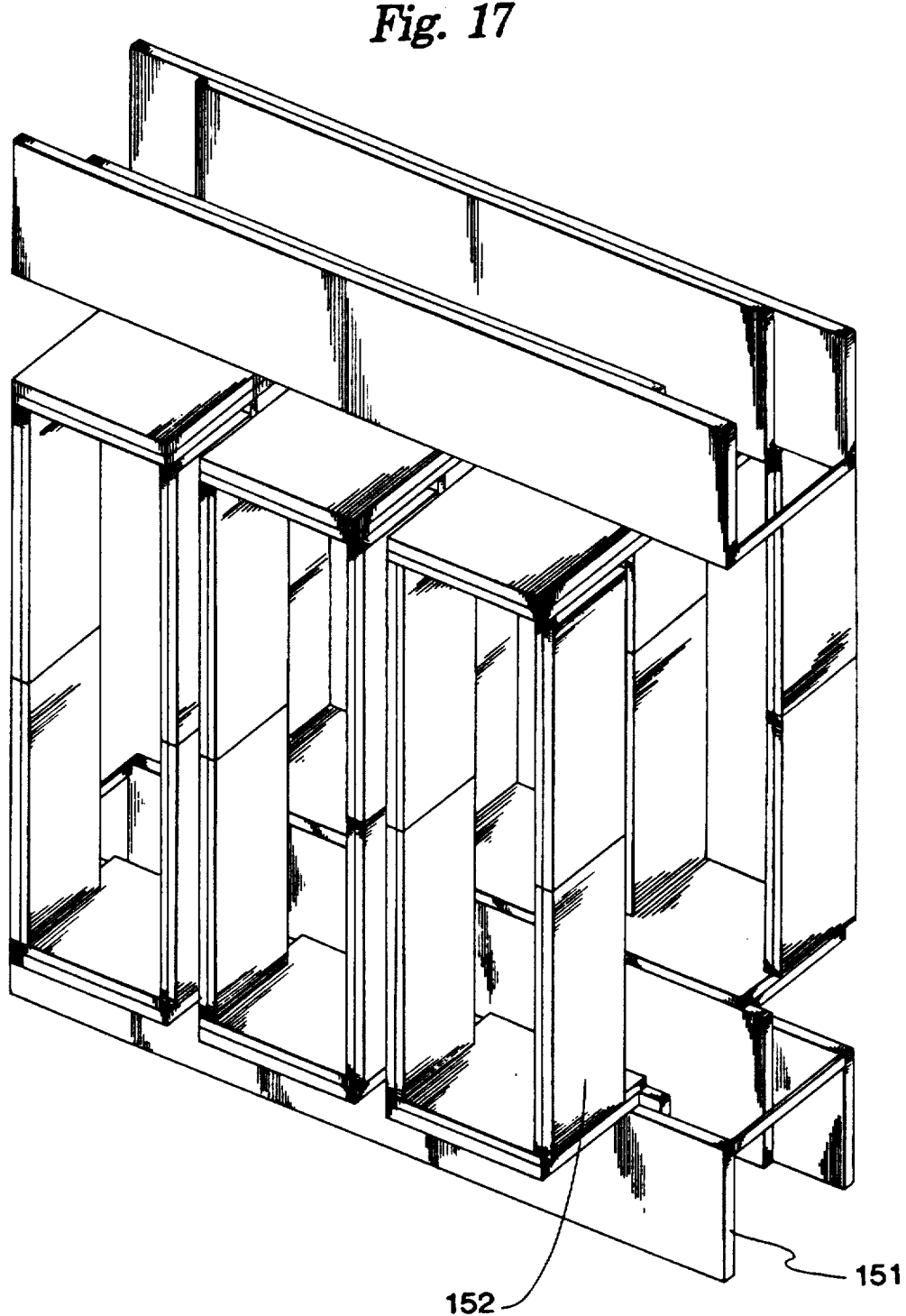
FIG. 17 is an isometric view thereof showing LVDC electrical bussing.

Referring now to FIG. 17, the horizontal LVDC bus means 151 and the vertical LVDC bus means 152 are shown. The horizontal LVDC bus means 151 accepts the LVDC outputs from the power supply converter means 111 and routes appropriate voltages to the vertical LVDC bus means 152 to distribute low voltage DC to bricks in column 71. It will be recognized that the organization of the power supply housing means 91 and 92 on both the top and bottom of the computer processing system of the present invention allow the vertical LVDC bus means 152 to have a significantly lower voltage drop along the bus because of the decreased length that the electric current on the bus must travel through.

Figure 18:
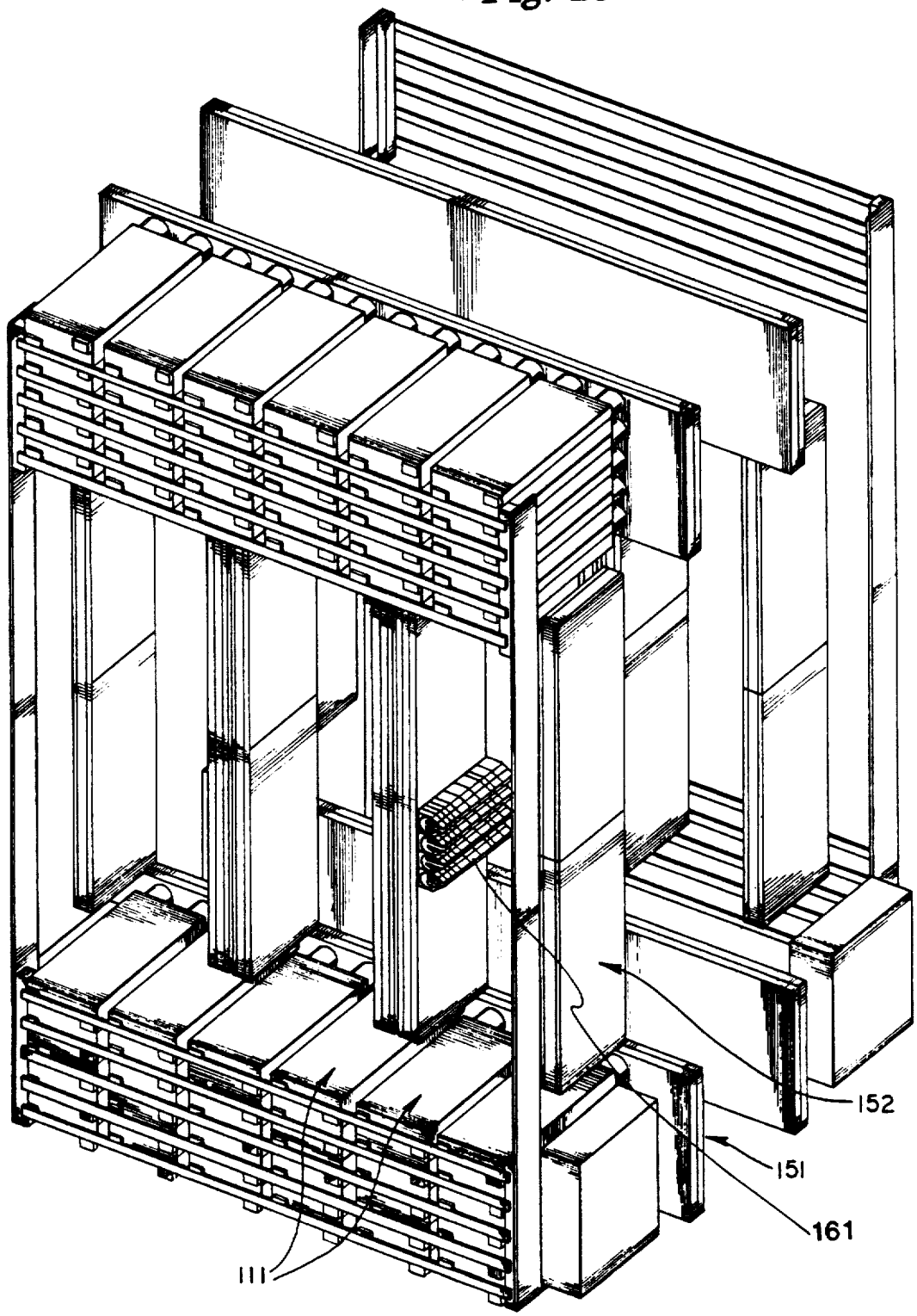
FIG. 18 is an isometric view thereof showing DC bussing, brick power connectors, and power supplies.

Referring now to FIG. 18, the HVDC bus assemblies 142 with the horizontal LVDC bus means 151 and vertical LVDC bus means 152, along with the individual power converters 111 are shown. Also shown are the zero insertion force brick power connectors 161 for connecting the vertical LVDC bus means 152 to each of the laminated power substrates 83 in the bricks 71.

Figure 19:
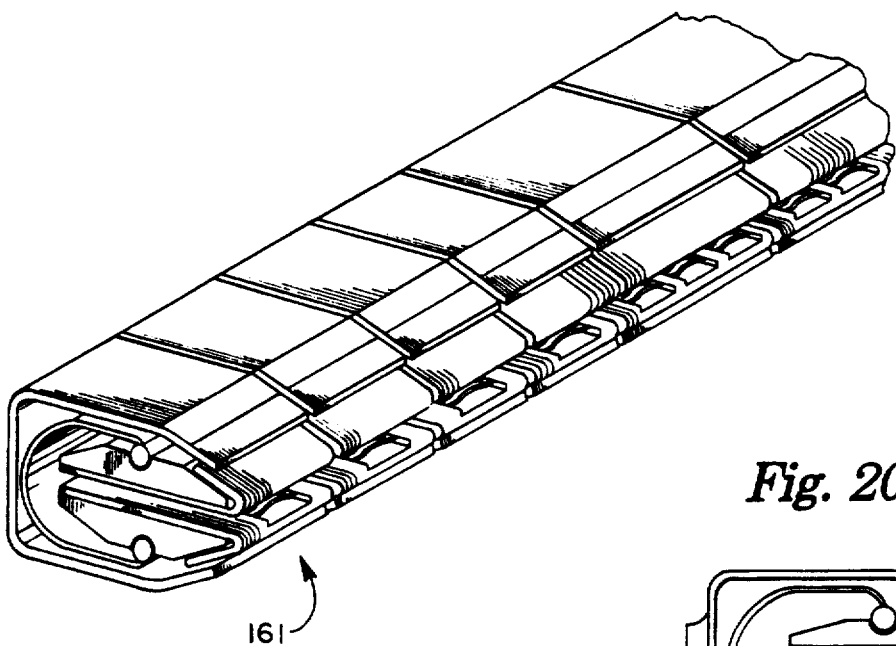
FIG. 19 shows a fragmentary pictorial detail view of the zero insertion force LVDC bus-to-brick power connector.
Figure 20:
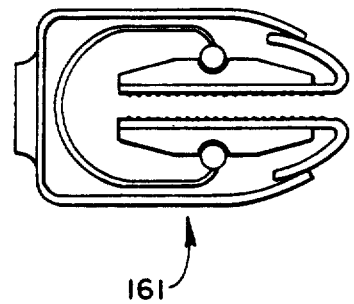
FIG. 20 is a side view of the zero insertion force LVDC bus-to-brick power connector.

FIGS. 19 and 20 show a detailed view of the zero insertion force brick power connector.

Cooling Distribution

Figure 21:
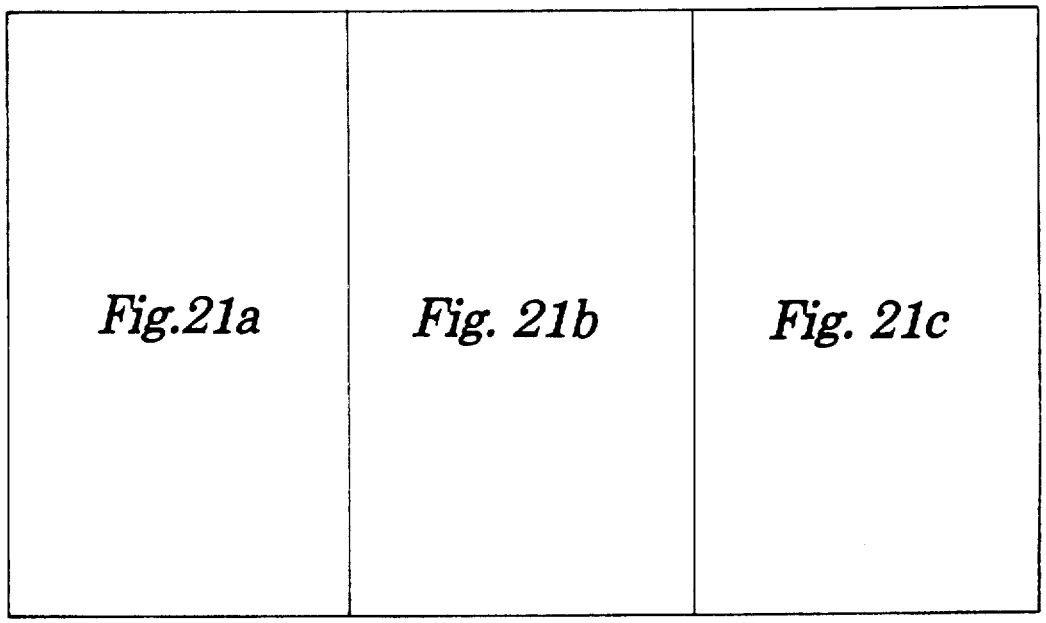
FIGS. 21c and 21b a cluster coolant flow diagram.
Figure 21B:
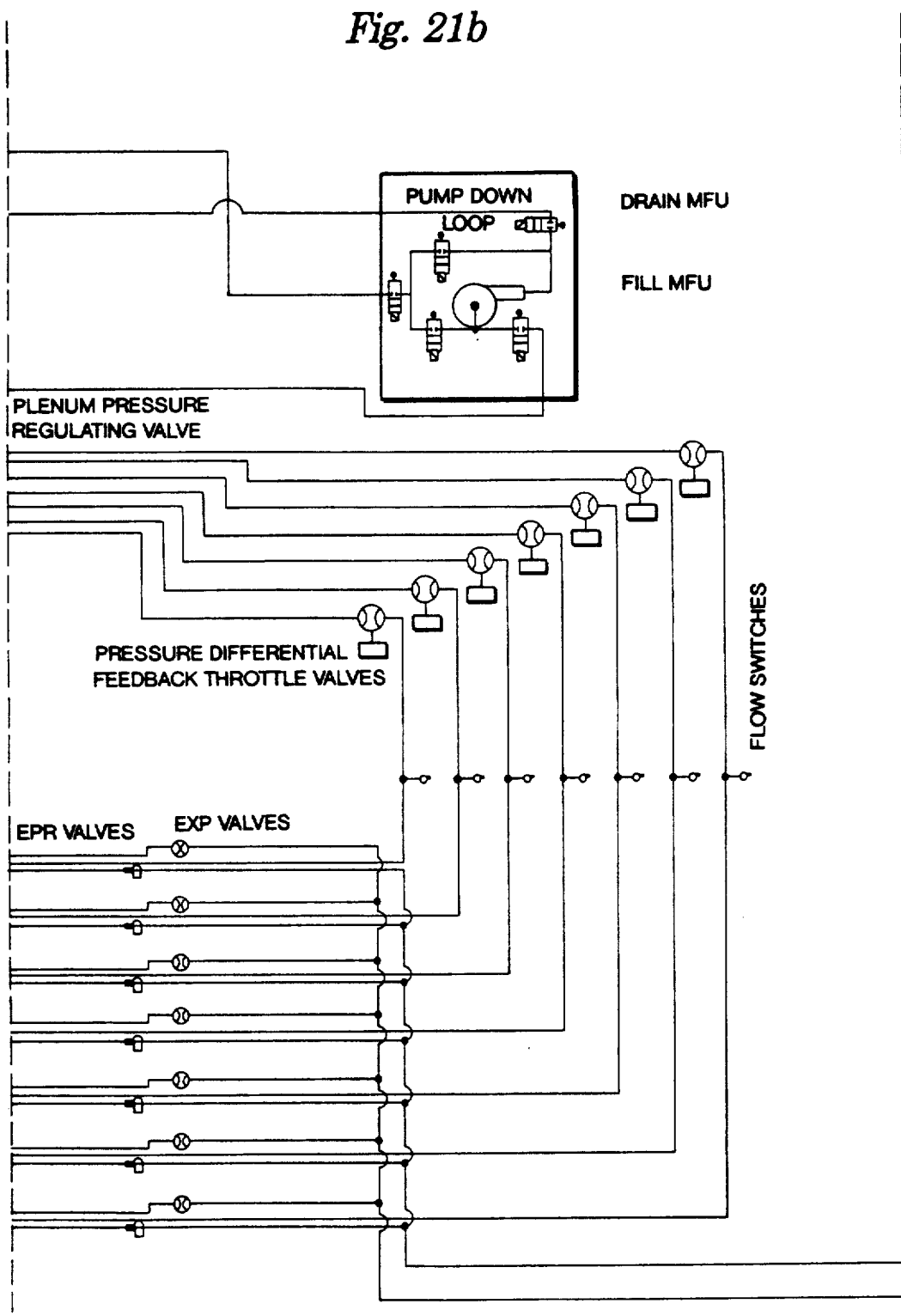
Figure 21C:
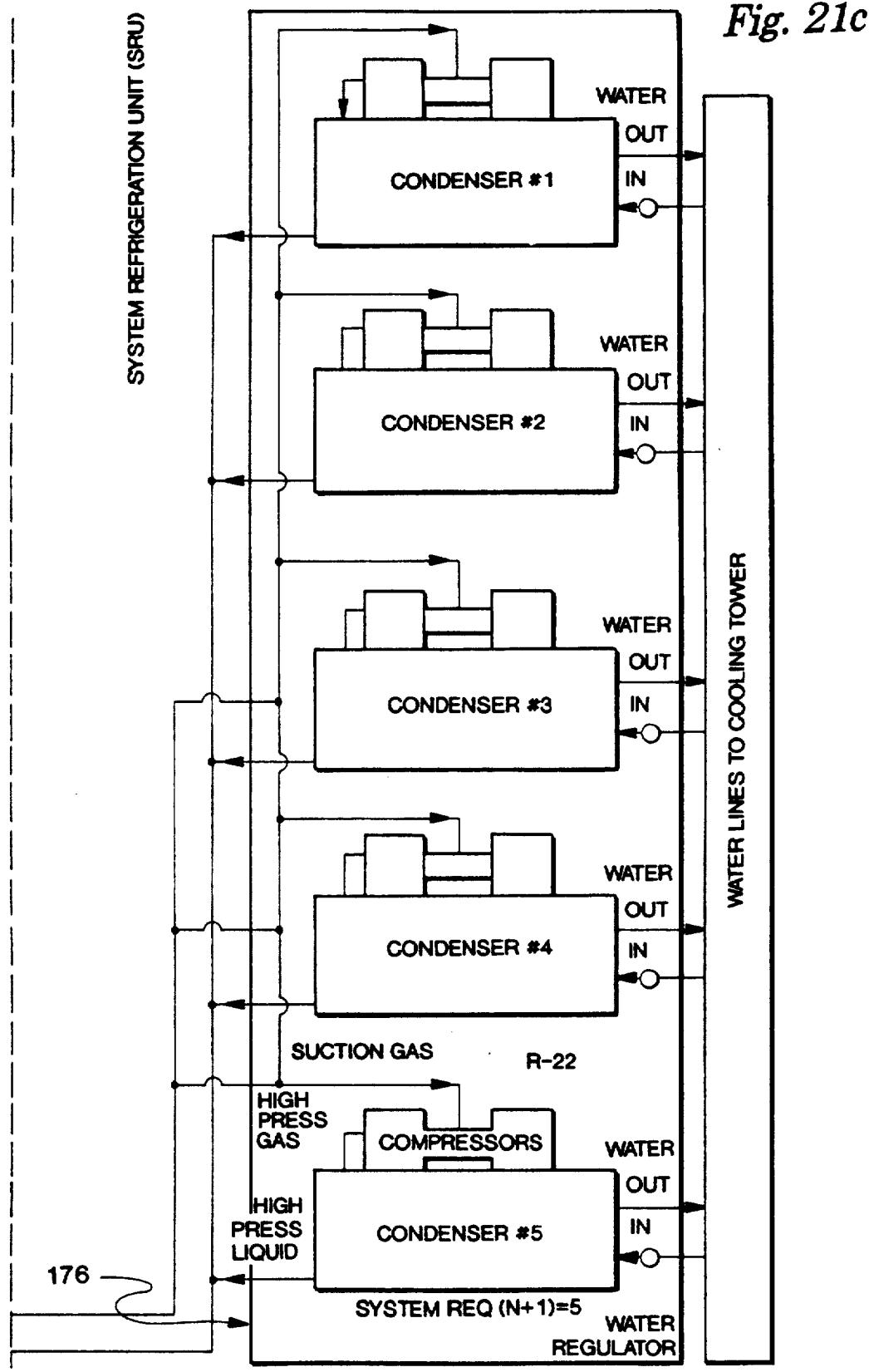

Now referring to FIG. 21, an inert fluorocarbon fluid is pumped from the heat exchanger means 171 at approximately 10 degrees C. and sent to the mainframe 50. There are seven heat exchanger means 171 for the seven fluid distribution loops located in the system. Two are used for two CPU columns in the present invention, two are used for four columns of memory, one is used for the mainframe power supplies, one is used for the IOC 52, and one is used for the SMS 53. Fluid leaves the mainframe at approximately 25 degrees C., and is sent via a surge tank 172 by a pump means to a plenum 173. A pressure regulating valve 174 controls pressure in the plenum. The surge tank 172 is used as a return tank and maintains continuous head pressure to the pumps. The surge tank 172 also is used to bypass fluid from the plenum 173. A vapor recovery system 175 is used to return gases to the surge tank 172. The refrigeration units 176 use water regulating valves to control head pressure. Refrigerant flow into the heat exchanger 171 is controlled by expansion valves and the temperature is controlled by EPR valves. The power supplies are cooled by forced convection while jet impingement is used on CPU and I/O integrated circuits with a forced convection being used for memory integrated circuits.

Figure 22:
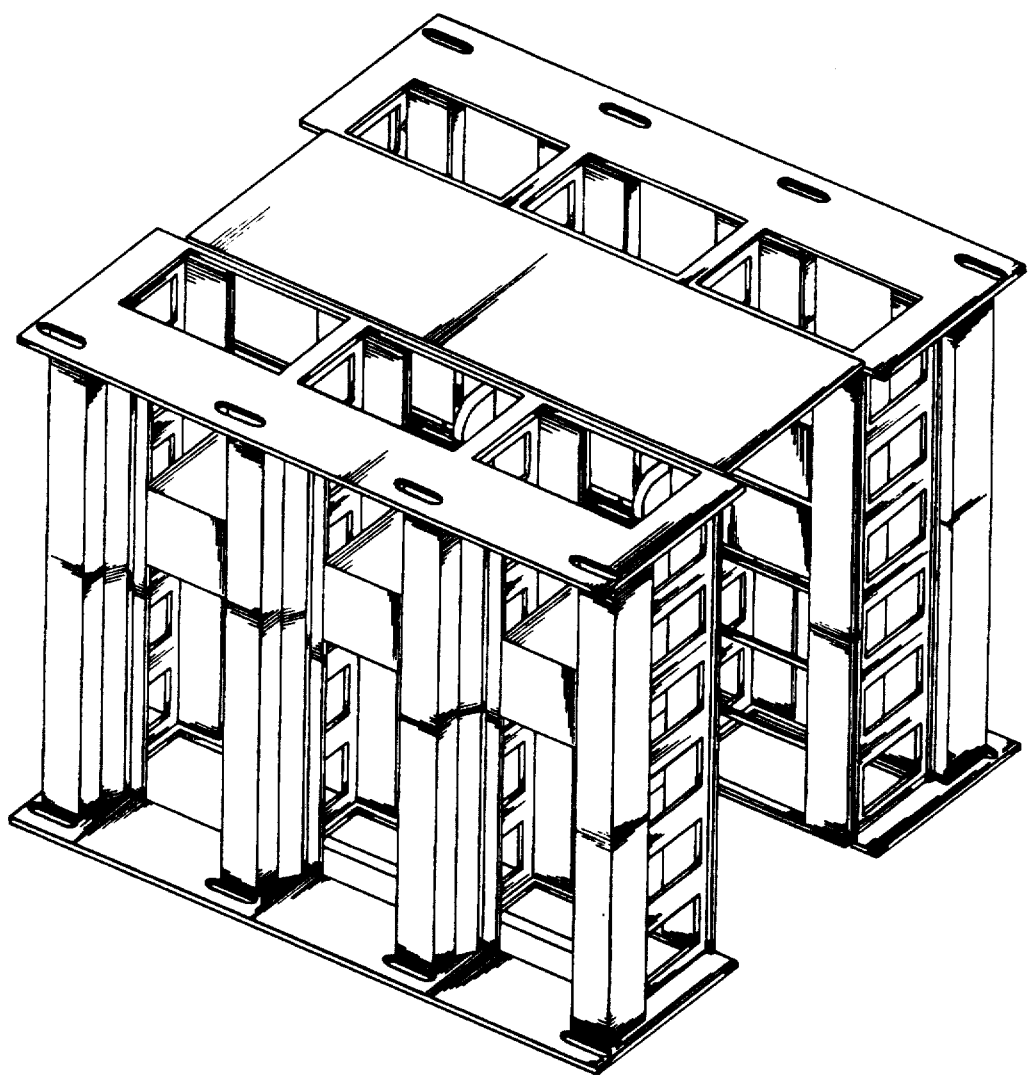
FIG. 22 is an isometric view thereof showing partial cluster frame for housing and support of bricks, wiring, and cooling components.
Figure 23:
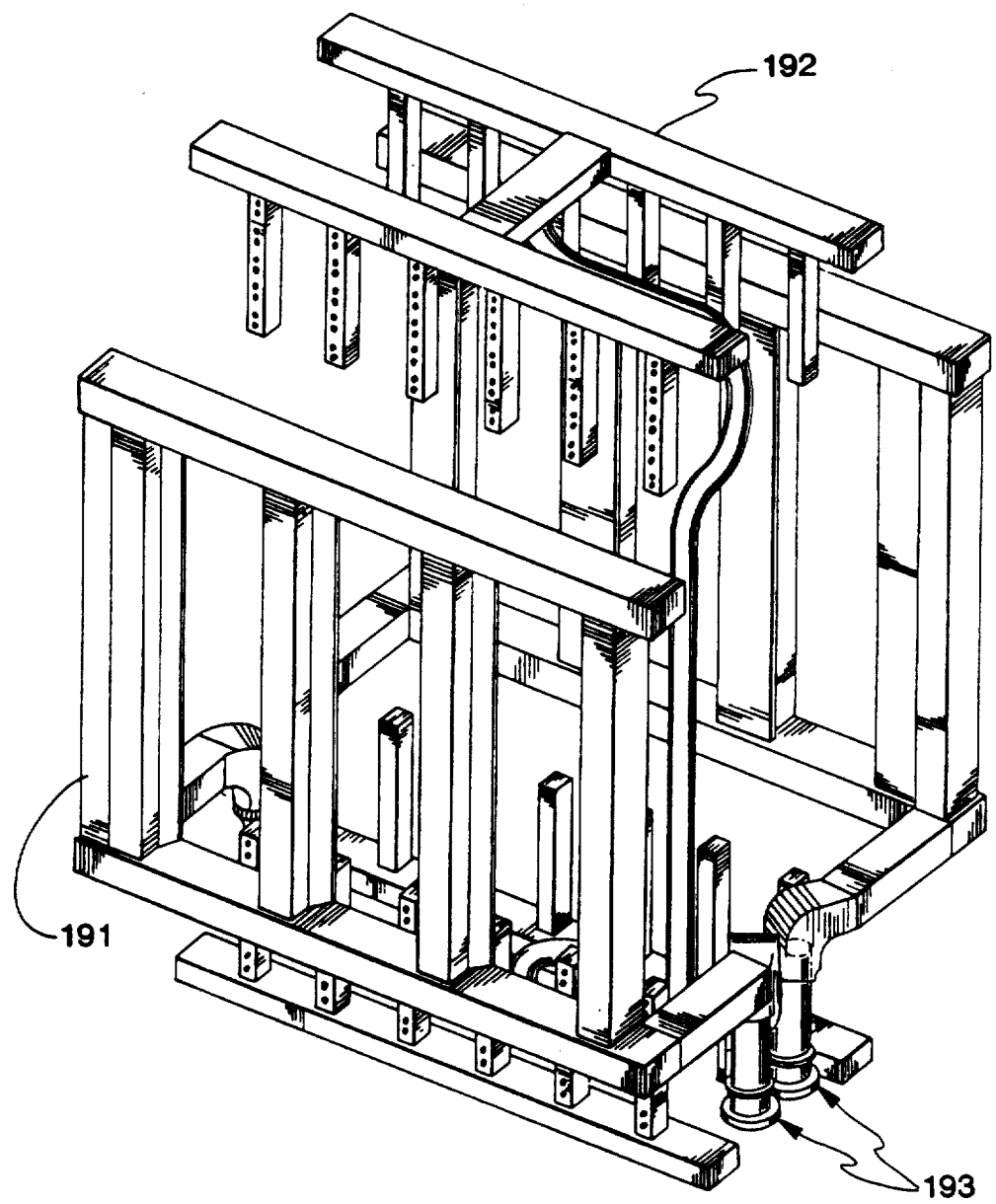
FIG. 23 is an isometric view thereof showing cooling fluid manifold assembly.

Referring now to FIG. 22, an isometric view of the partial cluster frame for housing and support of bricks, wiring, and the cooling components 191 in FIG. 23 is shown.

Figure 24:
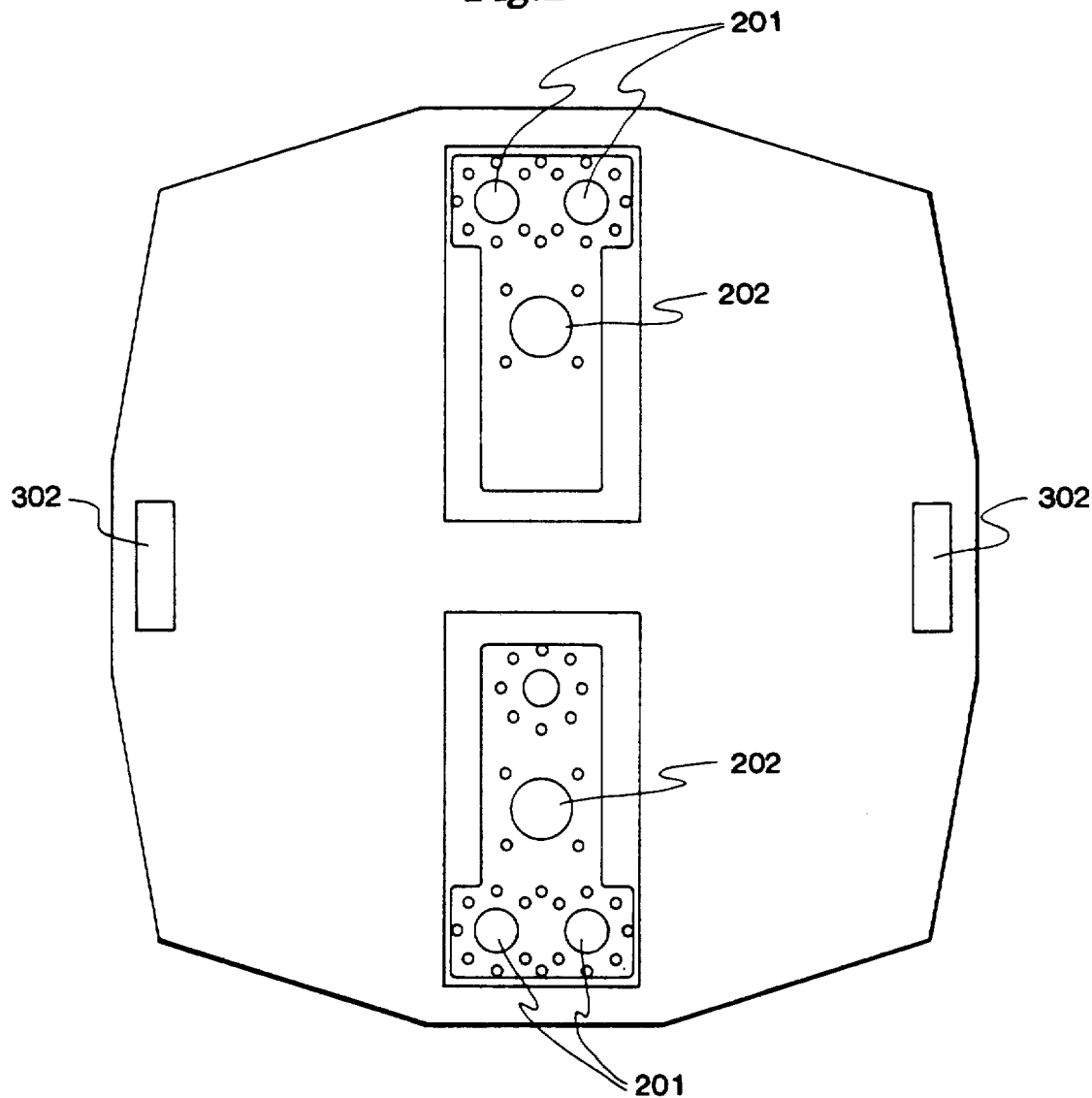
FIG. 24 shows the top plan view of a base plate for the mainframe.

Referring to FIG. 23, the fluid manifold assembly and FIG. 24, the base plate for the mainframe, the cooling columns 191, as well as the power supply cooling columns 192 are shown as part of this fluid distribution network. The cooling methodology is standard plenum head, similar to that of a water tower pressure scheme. In the preferred embodiment of the present invention, a liquid coolant enters the inlet cooling pipes 193 and 201 and is distributed throughout the cooling means for each of the columns 61/62 by the cooling column 191 and is distributed throughout the power supply converters 111 by the power supply coolant columns 192. After the coolant has been used in both the power supply and columns, it exits the mainframe 50 via outlet pipes 202. This network minimizes the static pressure drop and variation, thereby equalizing the flow and temperature of the fluid as it moves through the distribution network, through the impingement plates, and to the integrated circuits.

Brick Organization

Figure 25:
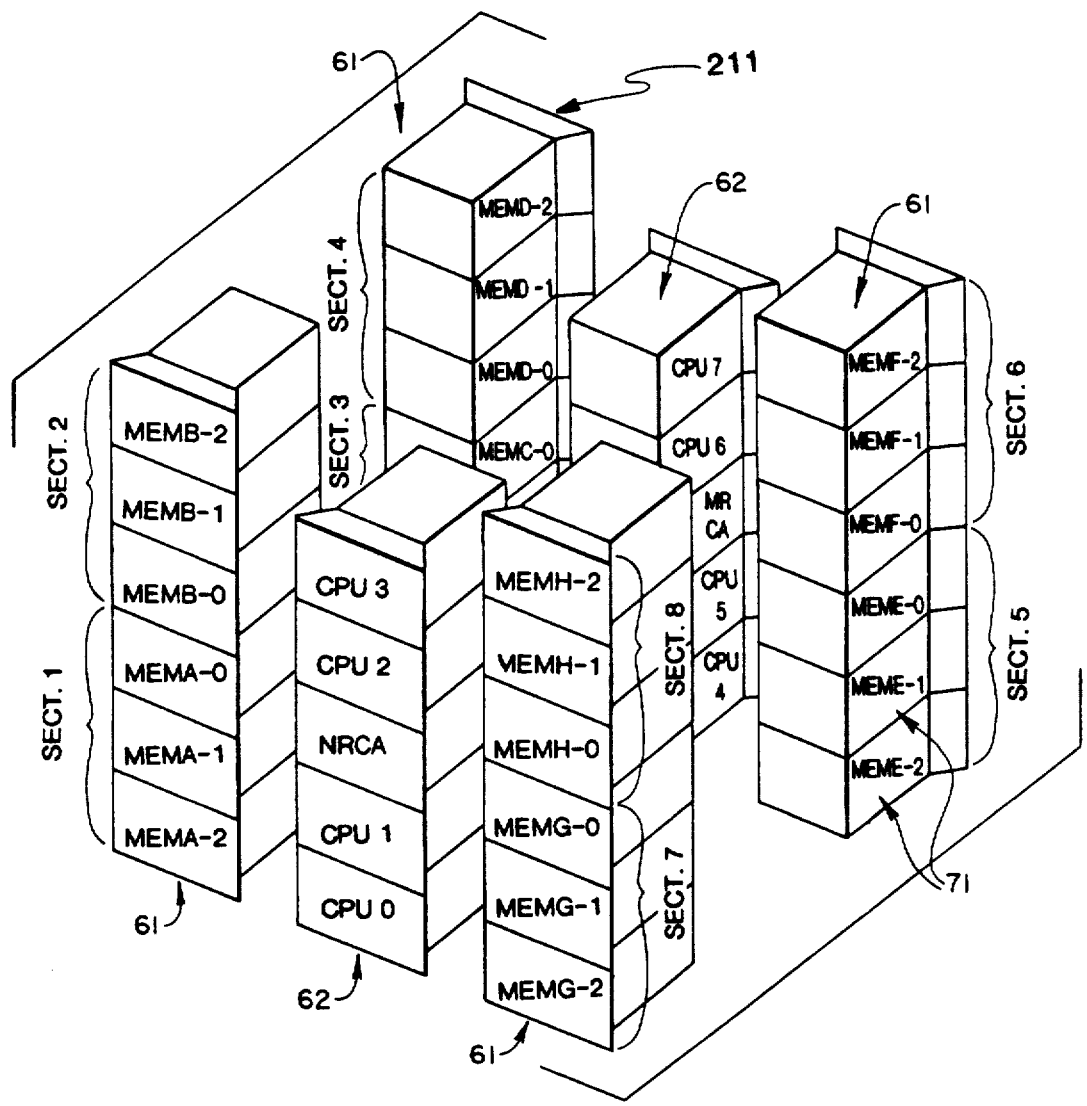
FIG. 25 is a simplified isometric view thereof showing bricks that comprise each of the memory and processor columns as arranged in a cluster.

Referring now to FIG. 25, the preferred embodiment of the bricks 71 that comprise each of the memory columns 61 and processor columns 62 of the mainframe 50 of the present invention will be described. FIG. 25 is a pictorial drawing of the bricks 71 for a single mainframe 50. Each brick represents either a processor 10, a Memory Remote Cluster Adapter (NMCA), a Node Remote Cluster Adapter (NRCA), or main memory 14. It will be recognized that in the preferred embodiment of the present invention as described in greater detail in the related application, Ser. No. 07/459,083, the main memory 14 is divided into eight sections. Each set of three memory bricks is associated with one section of memory. Each of the memory columns 61 contains two sets of three memory bricks 71. It will be noted that each of the bricks 71 also has associated therewith a manifold means 211 for operably connecting the brick 71 to liquid coolant as supplied by the cooling towers 161. The manifold 211 is a molded viton part that attaches directly to the impingement plates and then mates to the cooling columns 191 with an 0-ring.

Figure 26:
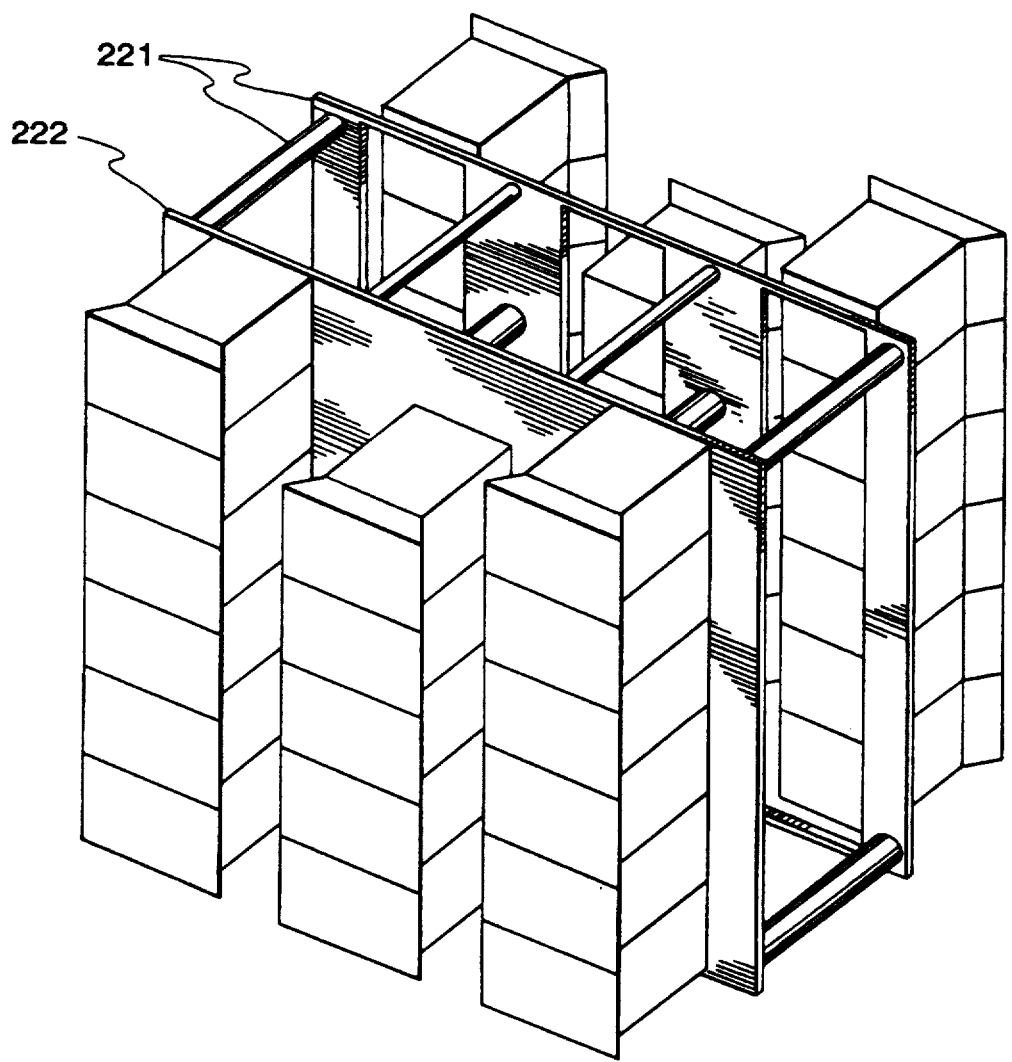
FIG. 26 is an isometric view thereof showing a cluster of bricks and the backplane wire mat volume.

FIG. 26 shows a partial frame assembly for a single cluster. Back plane connectors 222 and twisted wire pairs 221 connect the bricks. Most of the memory column wiring is intracolumn. Processor bricks are not wired intra-column since they do not communicate directly with each other. Intercolumn wiring exists between processor columns, memory columns, MRCA/NRCA, and the IBC. All backplane wiring is accomplished using high speed, controlled impedance shielded twisted pair wire. The controlled impedance backplane connector uses flex circuits with ground plane to maintain signal integrity.

Figure 27:
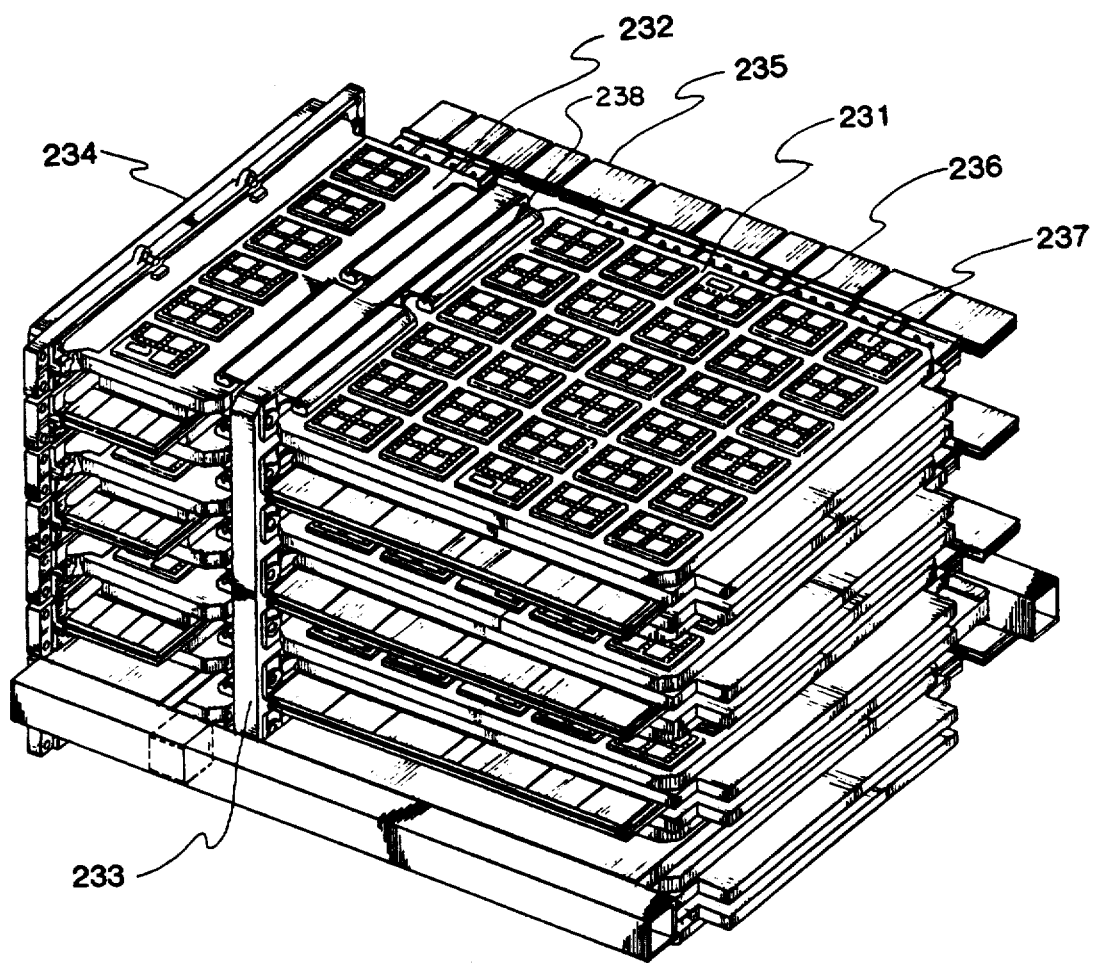
FIG. 27 is an isometric view thereof showing a processor brick assembly with all but one cooling fluid manifold omitted therefrom for clarity.
Figure 28:
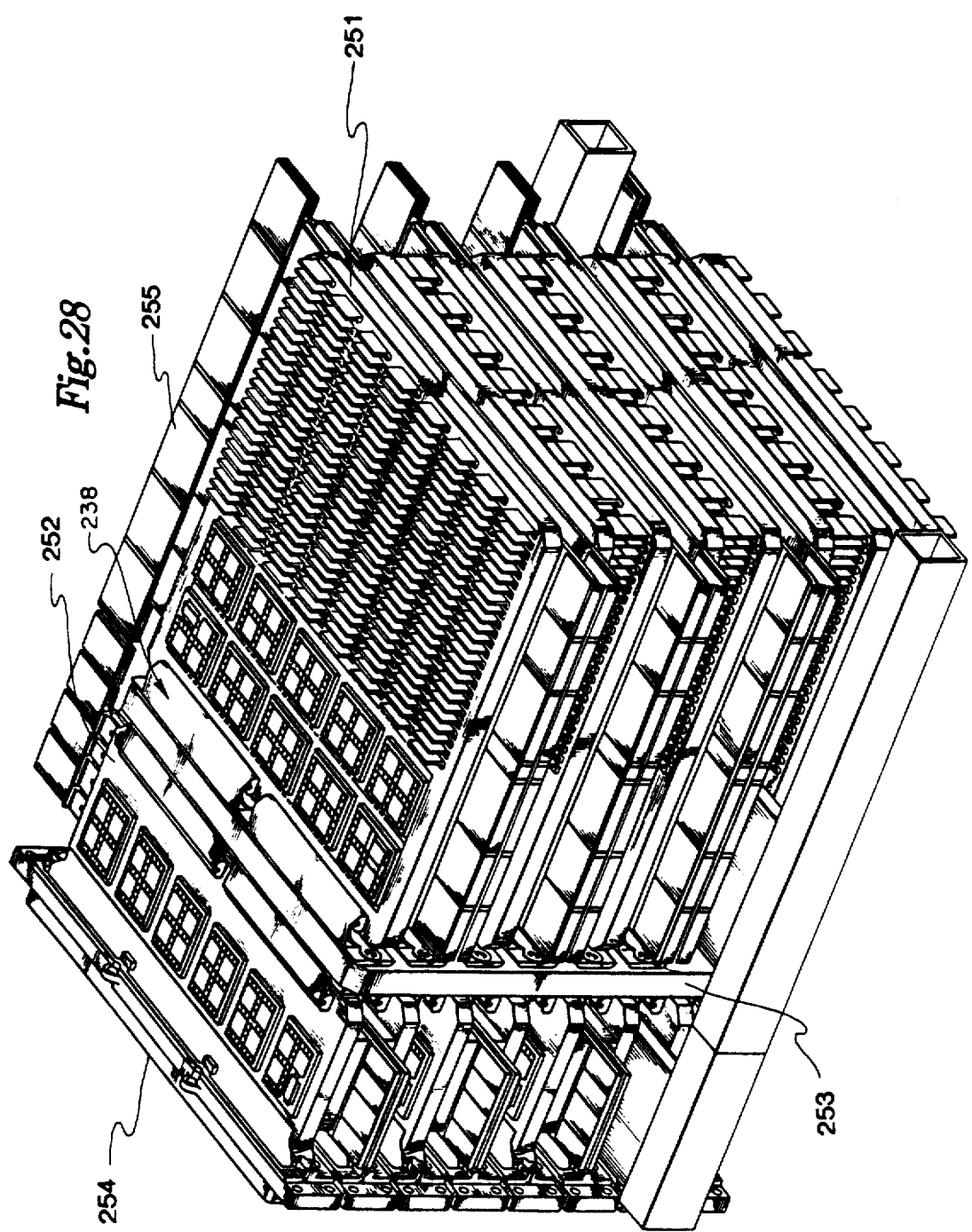
FIG. 28 is an isometric view thereof showing a memory brick assembly.
Figure 29:
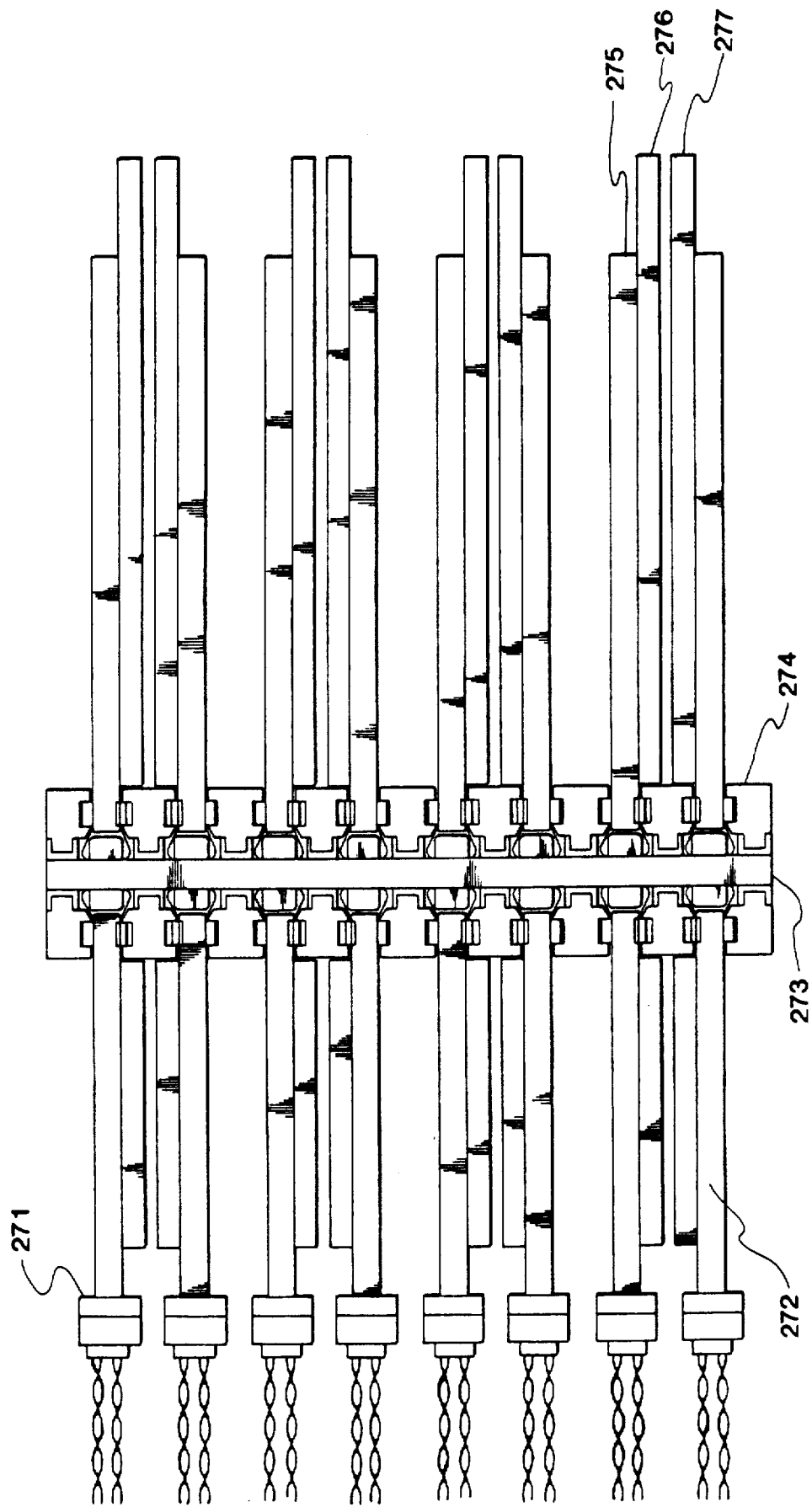
FIG. 29 is a side elevational view thereof showing processor brick subassembly.

Referring now to FIGS. 27, 28, and 29, the physical organization of a single brick 71 wig be described in further detail.

FIG. 27 shows a processor brick including the main module 231, the mini module 232, the Vertical Transformation Board (VTB) 233, the VTB connector 238, the backplane connector 234, the brick power connector 235, the interposer 236, and integrated circuits 237. In the preferred embodiment, it will be noted that each integrated circuit has 320 1/0 leads coming out through its bottom. There are four chips 237 disposed on each interposer means 236 via an areal surface mounting technique. Each interposer is a high density multi-layer interconnect substrate which enables the dense packaging of four logic devices along with transmission line terminating resistors. Presently, the limitation on the number of chips 237 per interposer 236 is a function of the current state of technology for producing the multi-layer interposer 236.

FIG. 28 shows a memory brick including the main module 251, the mini module 252, the VTB 253, the VTB connector 238, the backplane connector 254, and the brick power connector 255. Note that the chips on the main module of the memory brick are turned 90 degrees as compared to those on the mini module. This rotation allows more room for memory chips, terminator chips, and capacitors.

With reference to FIG. 29, a side elevational view of a processor brick is shown. The backplane connectors 271 may be implemented as eight individual connectors or as a frame assembly acting as a shell for bricks to plug into. The mini modules 272 and main modules 275 attach to the vertical transformation board 273 via the VTB connectors 274. The laminated power substrate (LPS) means 275 and 277 provides an area array of pads which interconnect to the back of the multi-layer substrate (MLS) to power the components on the substrate.

Figure 30:
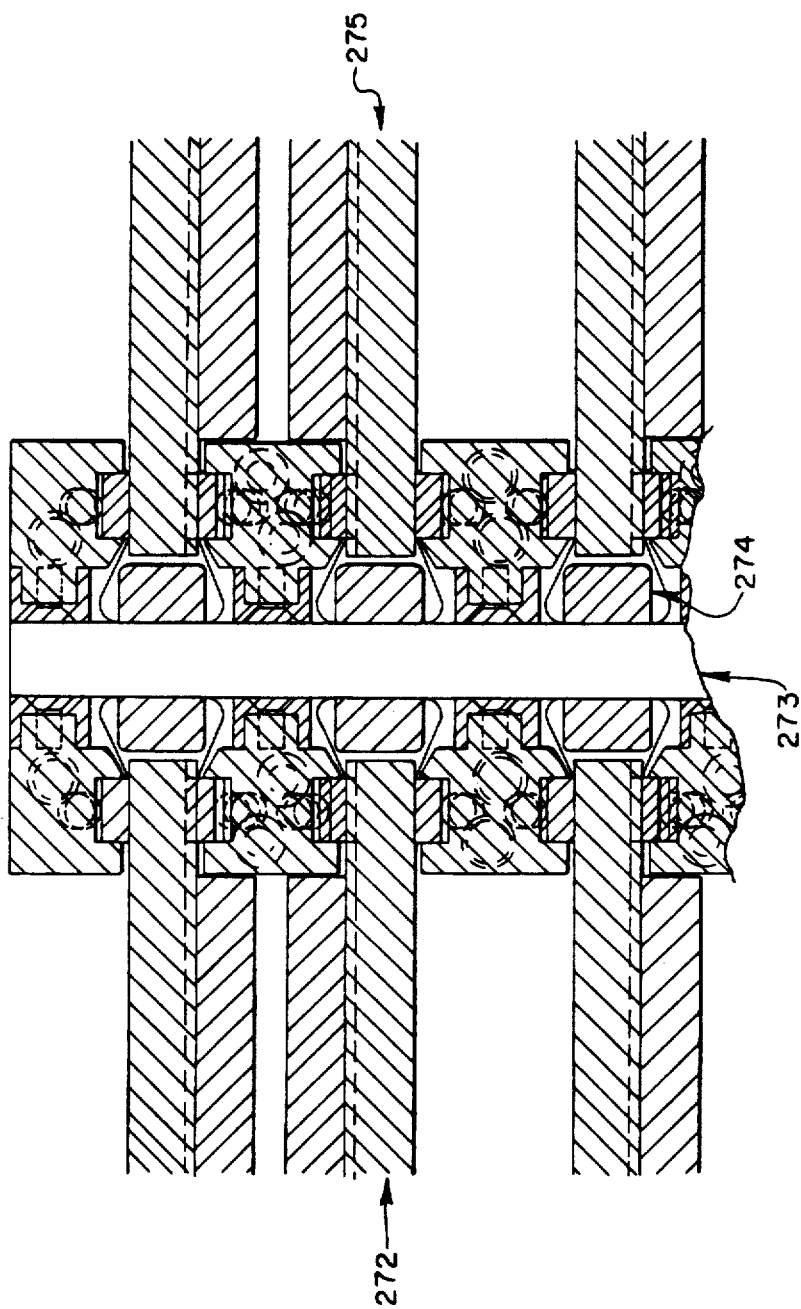
FIG. 30 is a fragmentary detail view of a vertical transformation board (VTB) and VTB connector.

Referring now to FIG. 30, a cross sectional cut away view of the Vertical Transformation Board (VTB) 273 and VTB connector 274 are shown. The VTB 273 provides a means of intersecting a plurality of mini modules 272 and main modules 275 by providing a communication path for signals between substrates. The ball and socket approach is one possible implementation for mounting connectors to the VTB 273 and MLS.

Figure 31:
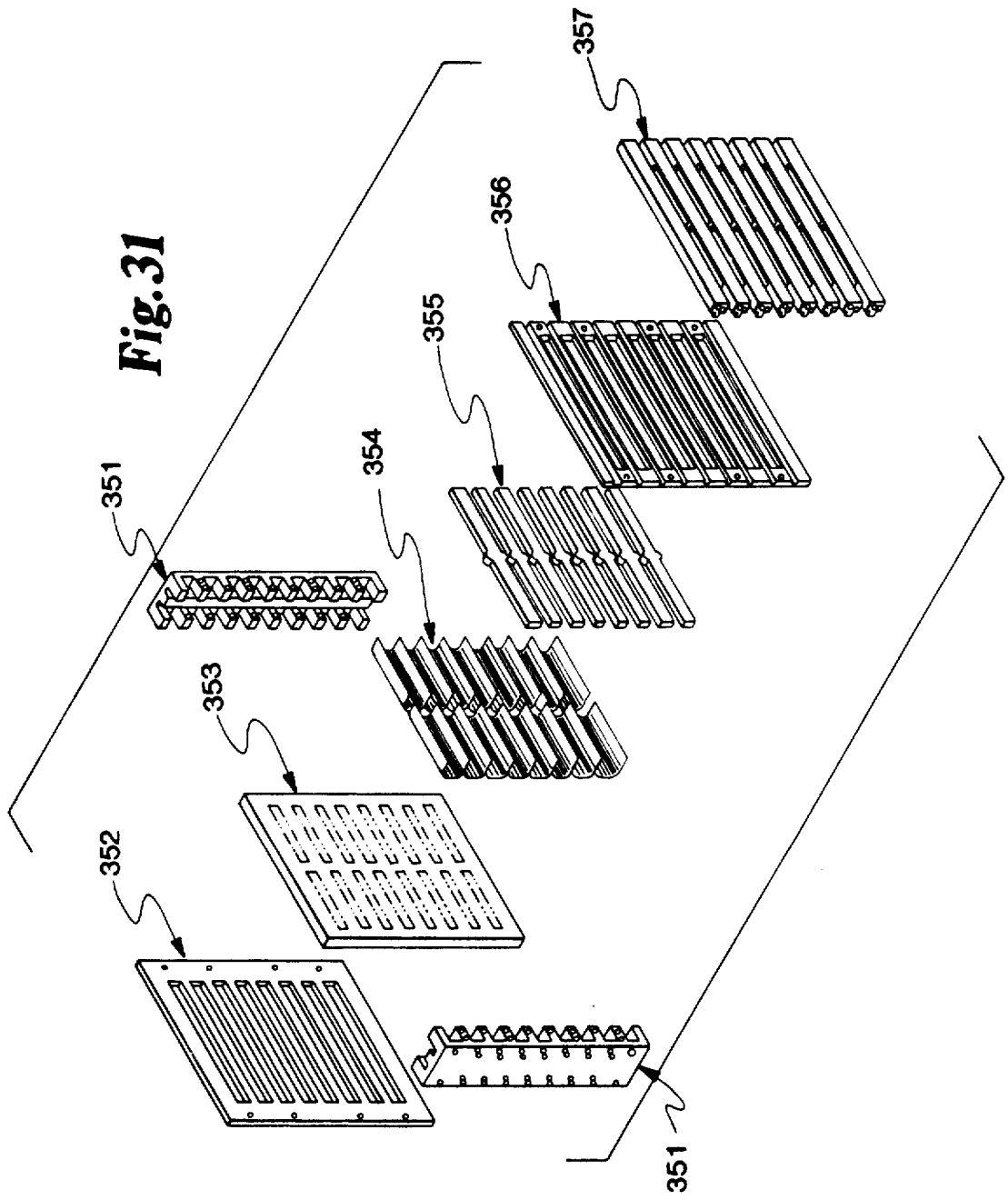
FIG. 31 is an exploded view of the VTB connector assembly.

Referring to FIG. 31, the VTB plate assembly is shown. Flex circuits 354 attach to a vertical transformation board 353. The pressure bars 355 holds the flex array of gold bumps against pads on the VTB 353 to provide contact. The screw fixture 356, the connector plate 357, the back plate 352, and the two side members 351 frame the structure to hold all pieces in place. This forms a mechanical package which can be manipulated without stressing the connections.

Figure 32:
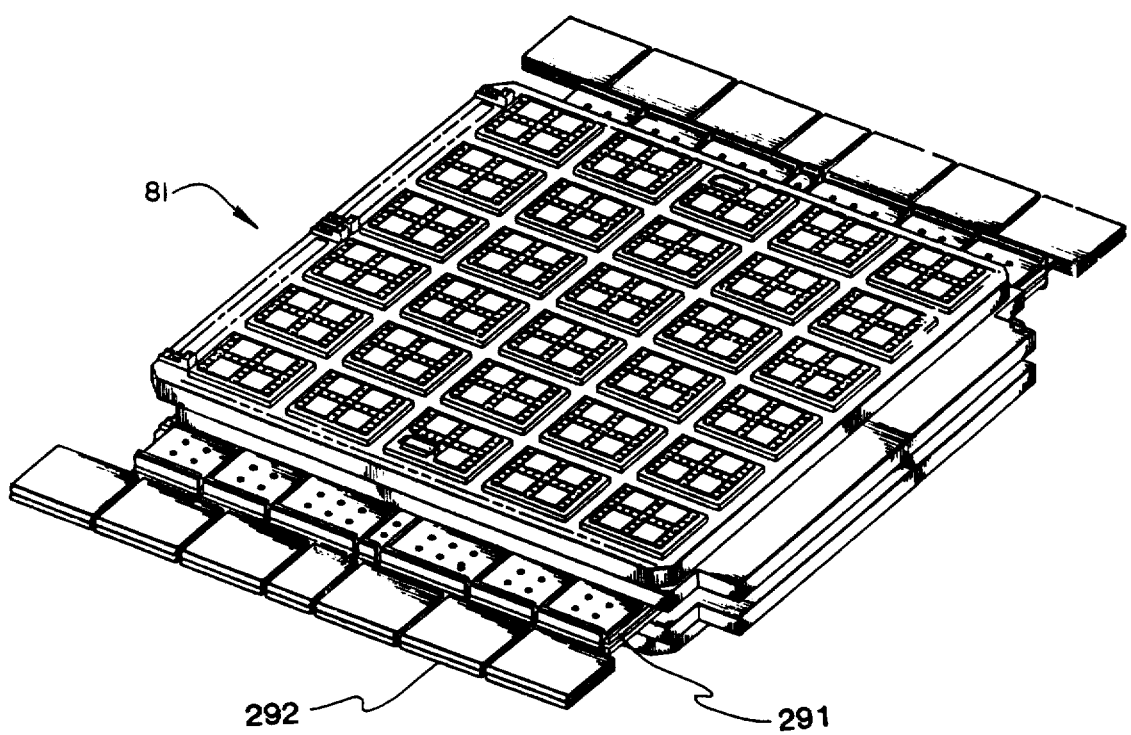
FIG. 32 is an isometric view thereof showing the main module of a processor brick subassembly.

Referring now to FIG. 32, a main module 81 for the processor brick is showm. The T Tabs 291 for the module assembly establish the distance between the top substrate surface and the bottom substrate surface in order to maintain distance between chips on the substrate and the impingement plates. If this height is too small, then the coolant stream is not focused. Tolerance of substrates varies significantly as a result of the build process. The P Tab 292 is the mechanism used to keep the modules in proper relation and provide the connection path for module power.

Figure 33:
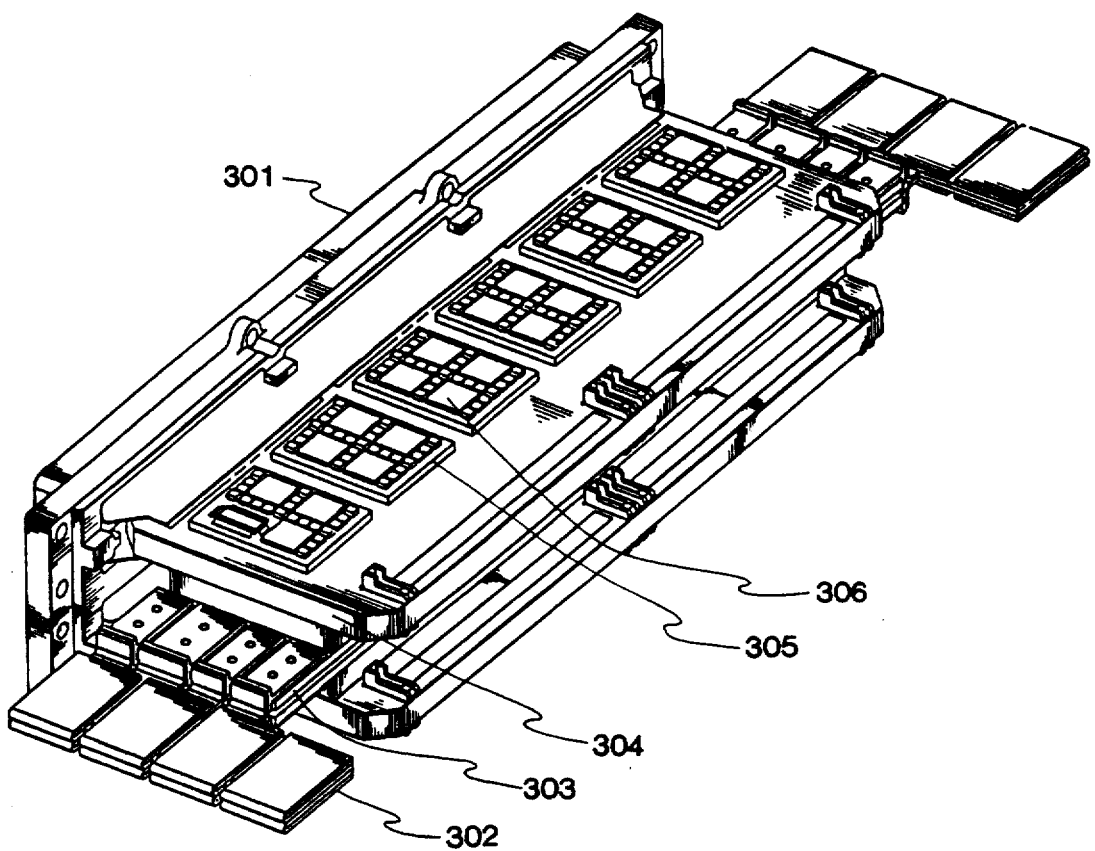
FIG. 33 is an isometric view thereof showing the mini module of a processor brick subassembly.

Referring now to FIG. 33, a mini module for the memory brick is shown. The T Tabs 303, the P Tabs 302 are again used to maintain a standard relationship between chips and impingement plates. The MLS 304 supports the interposers 305 holding integrated circuits. Note that the backplane connector 301 may be implemented as either a unitary or a modular structure.

Figure 34:
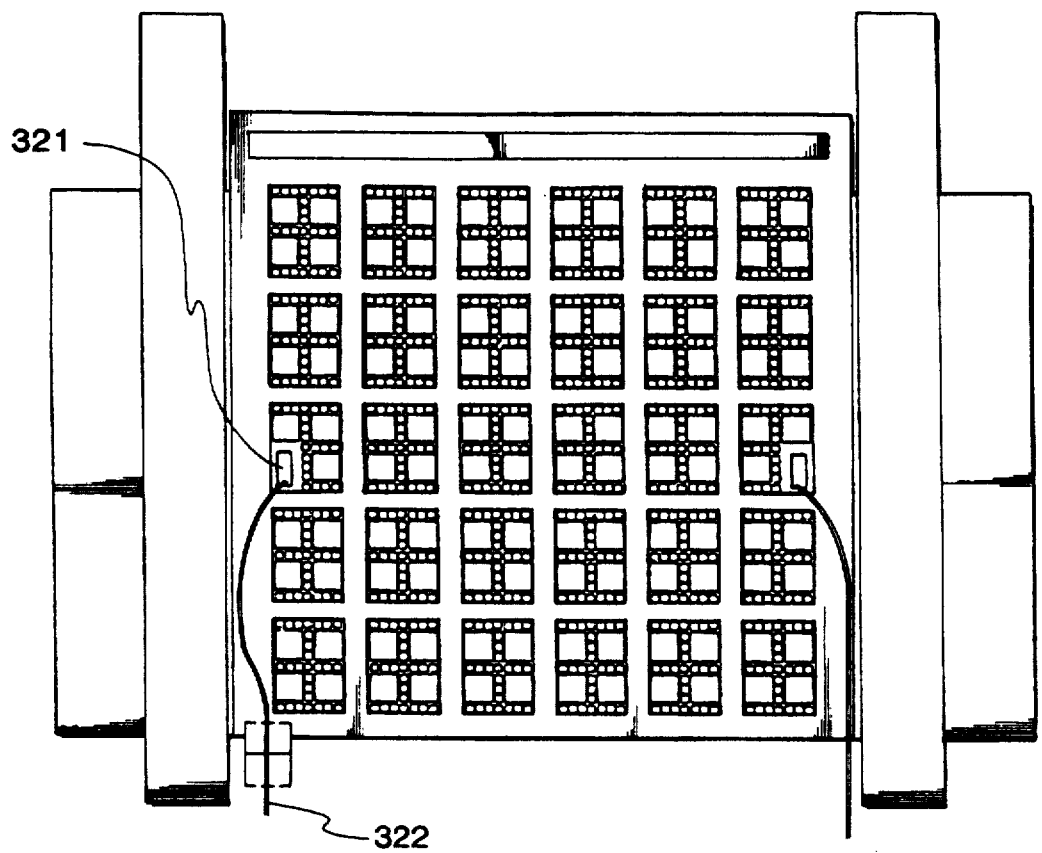
FIG. 34 is a top plan view thereof showing the placement of the clock distribution chip.
Figure 35:
FIG. 35 is a front elevation thereof showing the placement of the clock distribution chip and cable on a substrate assembly.

Referring now to FIG. 34 and FIG. 35, the placement of the clock distribution chip means 321 on an interposer and clock distribution cable 322 for a processor brick is shown. FIG. 35 shows a front view of the placement of the clock distribution chip for a processor brick. For a more detailed description of the clock distribution scheme for the present invention, see the related clock distribution architecture application, Serial No. 07,xxx,xxx. If the chip 321 supports an optical clock, then the clock distribution cable 322 is an optical fiber. If the chip 321 supports an electrical clock, then the clock distribution cable 322 is wire based. Two clock distribution chips exist on each main module; one clock distribution chip exists on each mini board.

Figure 36:
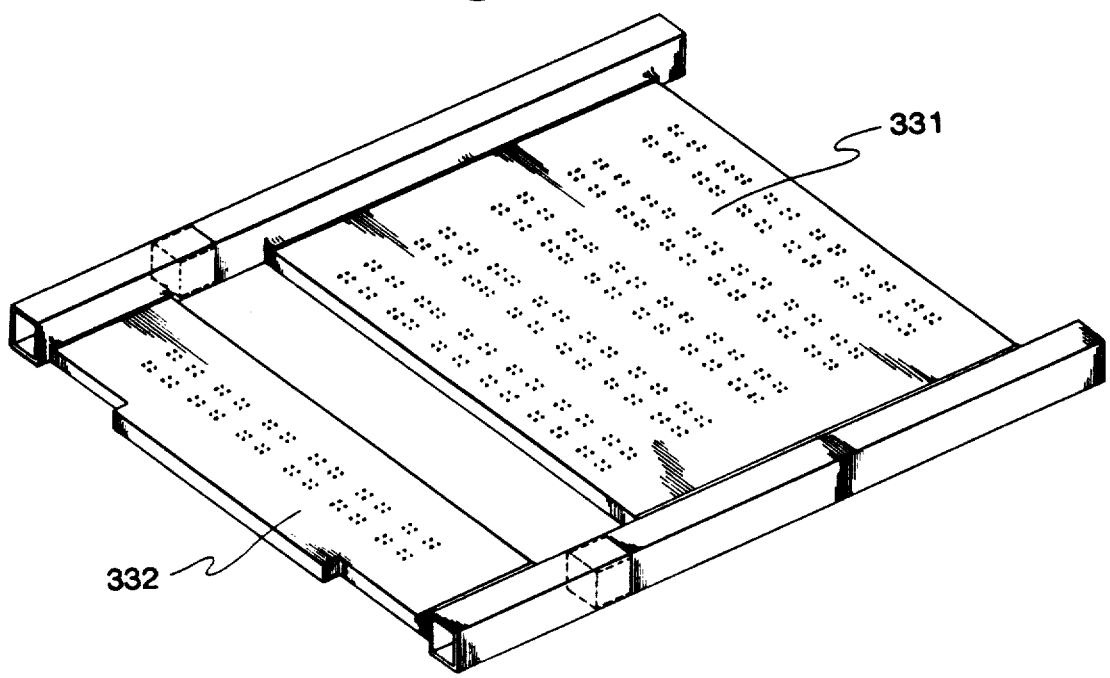
FIG. 36 is an isometric view thereof showing an impingement plate.
Figure 37:
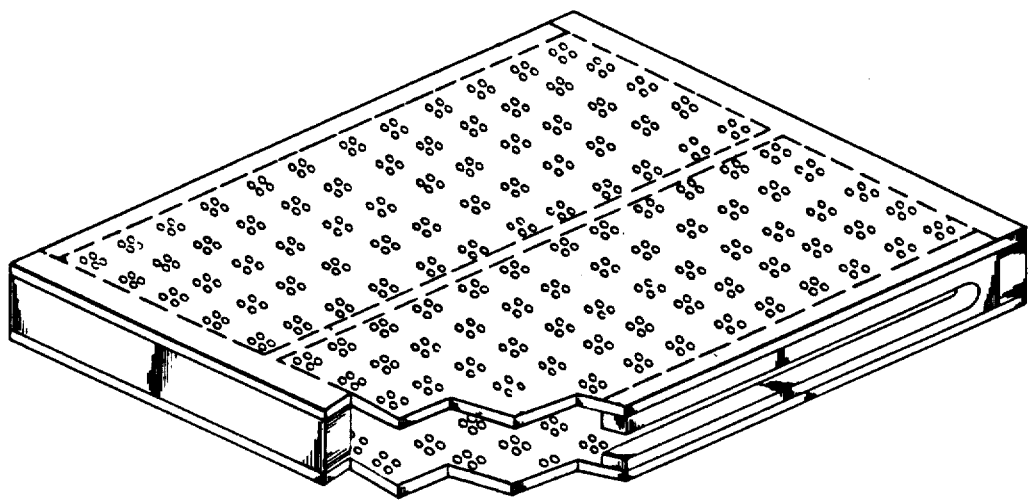
FIG. 37 is an isometric cut away view of an impingement plate.
Figure 38:
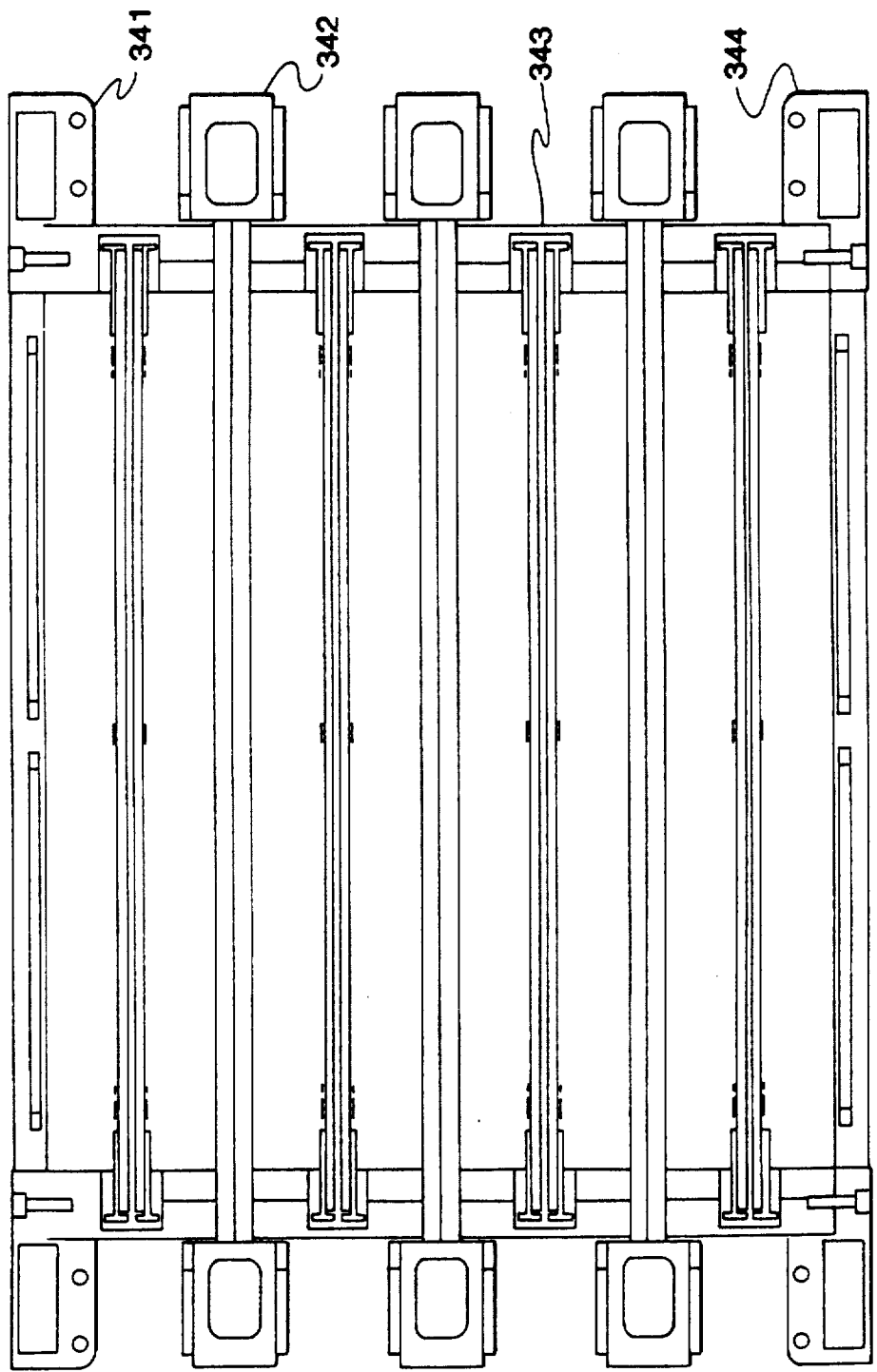
FIG. 38 is a cross section view of a brick impingement plate assembly.

Referring now to FIGS. 36 through 38, the impingement plates 331, associated with the main module 81 and impingement plate 332 associated with the mini module 82 will be described. FIG. 37 represents a cut away view of a standalone impingement plate as shown in FIG. 36. FIG. 38 shows a cross section view of the impingement plate assembly. A plurality of impingement plates 342 and end impingement plates 341 and 344 attached to the frame member 343 and interspaced with modular bricks directs the fluorocarbon fluid coolant to impinge upon the integrated circuit 306 surfaces. Each impingement plate has a plurality of impingement holes on at least one side for release of fluorocarbon coolant onto integrated circuit elements. Once coolant has impinged upon chips 306, it flows between interposers 305 and then off the substrate. Jet impingement on the integrated circuits 306 enhances cooling effectiveness of the preferred embodiment.

IOC Packaging

Figure 39:
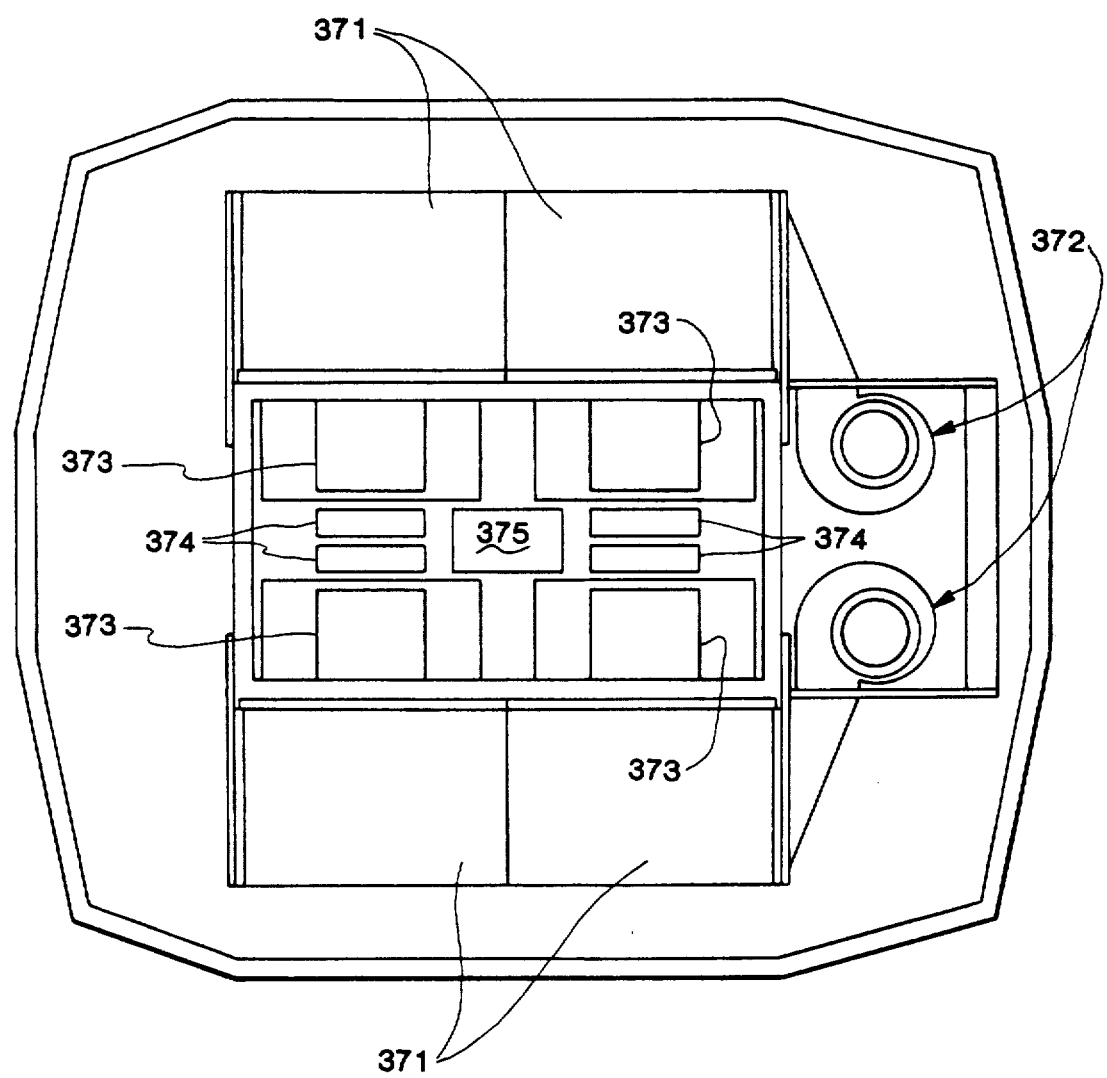
FIG. 39 is a top plan view of the I/O controller.
Figure 40:
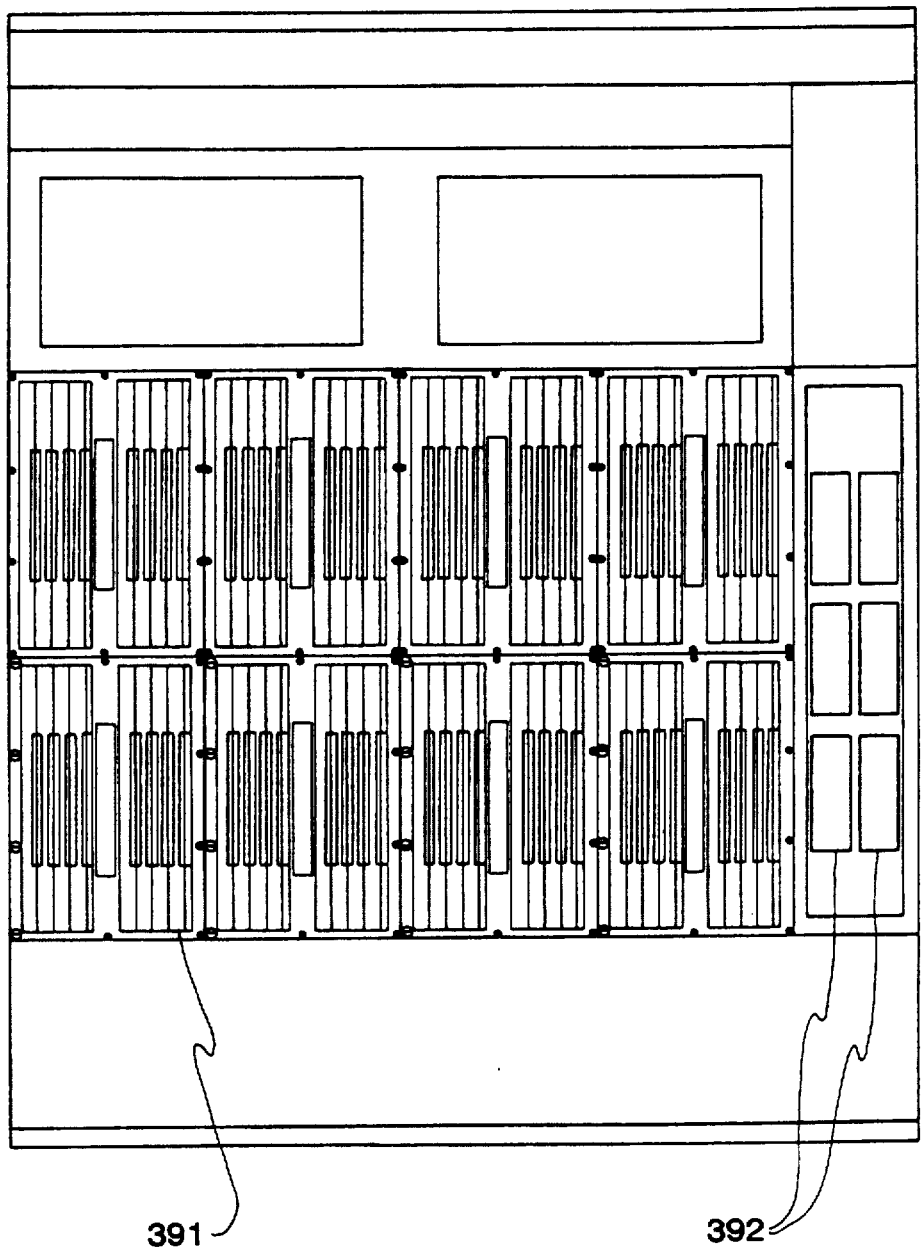
FIG. 40 is a simplified front elevational view of the I/O controller.

Referring now to FIGS. 39 and 40, the modular packing architecture for the Input/Output Concentrator (IOC) will be described.

FIG. 39 shows a top view of the IOC cabinet. This mechanism shows a means for supporting both channel cards 371 which are air cooled by blowers 372 and concentrator boards 373 and bus bars 374 which are cooled by the flurocarbon 375 fluid distribution system. The relationship between concentrator boards 373 and processors 10 is 1:1, since the modular packaging allows for a maximum of 8 concentrator boards 373 in a single IOC cabinet. The concentrator board 373 is a high performance organic MLS which is cooled with the fluorocarbon fluid. Each concentrator board 373 also supports an interface to main memory 14 through the arbitration node 20 and a connection to the secondary memory system. The channel cards 371 can also be configured modularly, with maximum space for 64 per IOC. FIG. 40 shows a front view of the IOC cabinet. The channel cards 391 reside in an air cooled environment and translate signals from the bipolar ECL environment of the mainframe 50 to the normal channel environment of the peripherals 32. In the implementation shown in FIG. 40, the channel cards 391 are mounted horizontally and are air cooled by blowers 393 with power supplies 392 beneath them. Another possible implementation is vertical mounting of the channel cards 391.

Each channel card 391 is driven by a concentrator board 373 that multiplexes eight channel cards 391 into one high speed channel capable of supporting a variant of the HiPPI protocol. One concentrator board 373 with eight channel cards 391 attached to it forms a field replaceable assembly.

Figure 41:
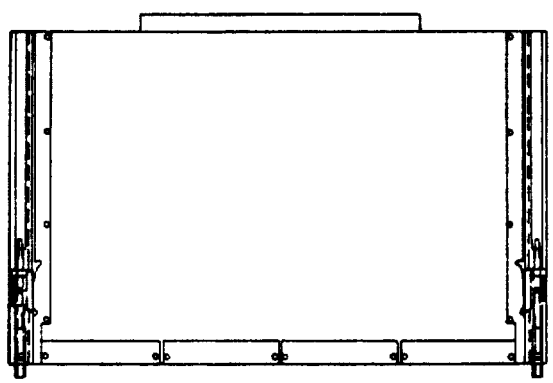
FIG. 41 is the top view of an I/O channel card.
Figure 42:
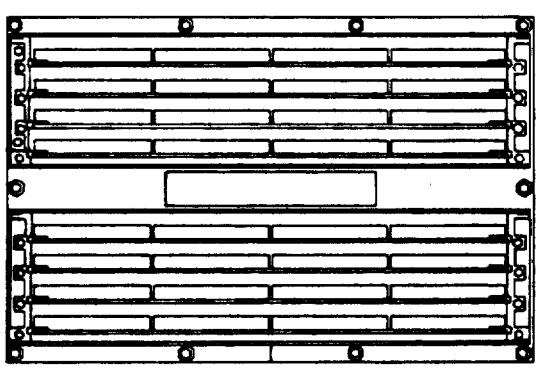
FIG. 42 is a front elevational view of an I/O concentrator subassembly.
Figure 43:
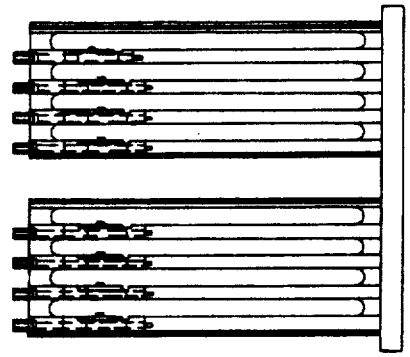
FIG. 43 is a side elevational view of an I/O concentrator subassembly.

FIGS. 41, 42, and 43 show the physical detail of the interface between the channel card 391 and the I/O concentrator board 373. FIG. 41 is the individual physical detail of a channel card 391. It shows a high density interconnect at the back where it cables to the concentrator board 373. At the front, it contains four standard HiPPI connectors. It provides a double wide interface that is 64 bits wide in and 64 bits wide out, although each connector has only 32 bits. FIG. 42 is a front view showing the interface of the channel card plugging into the backpanel. FIG. 43 is a side view, again showing the interface of the channel cards plugging into the backpanel which cables to the concentrator board 373.

SMS Packaging

Figure 44:
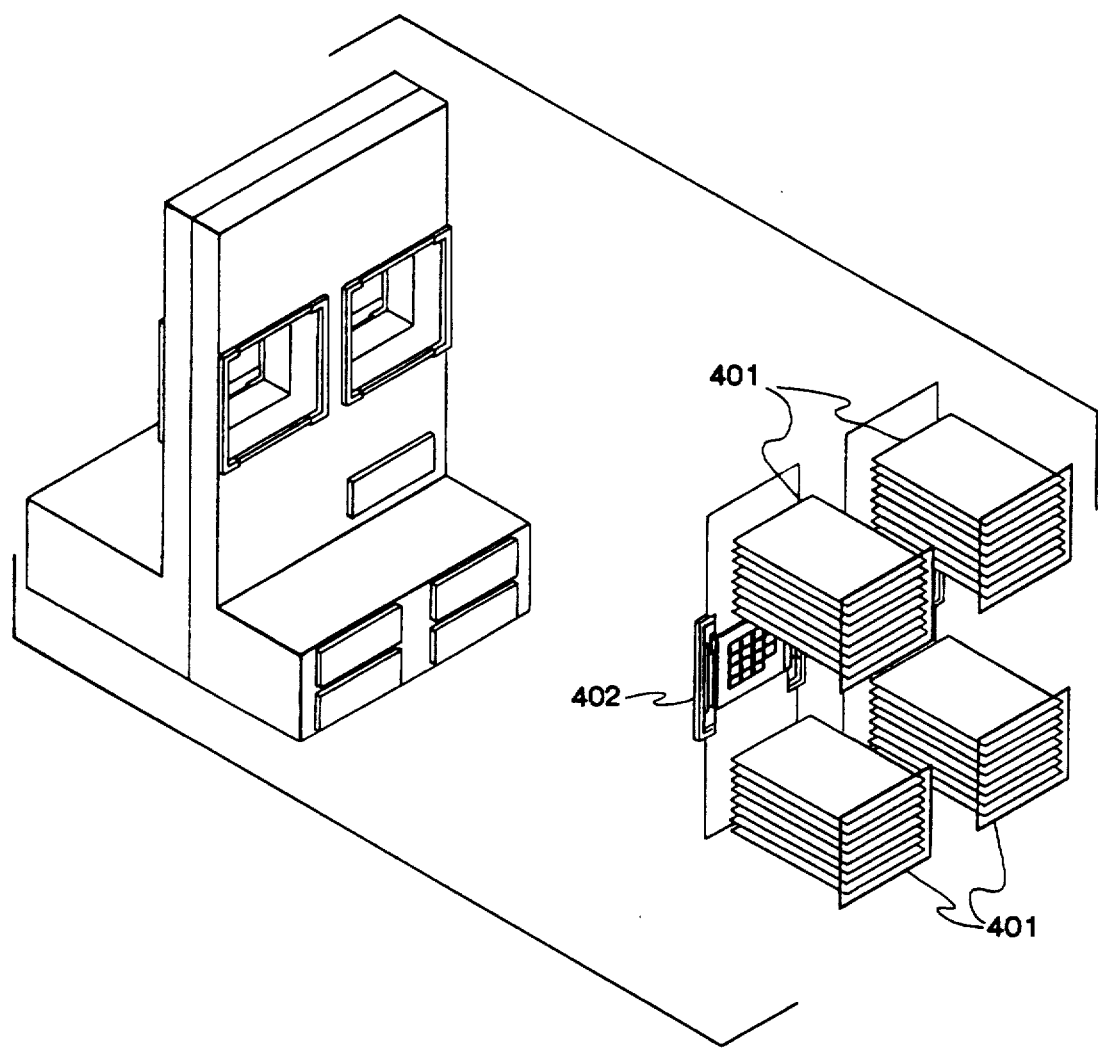
FIG. 44 is an exploded isometric view of Secondary Memory System (SMS) subassembly.
Figure 45:
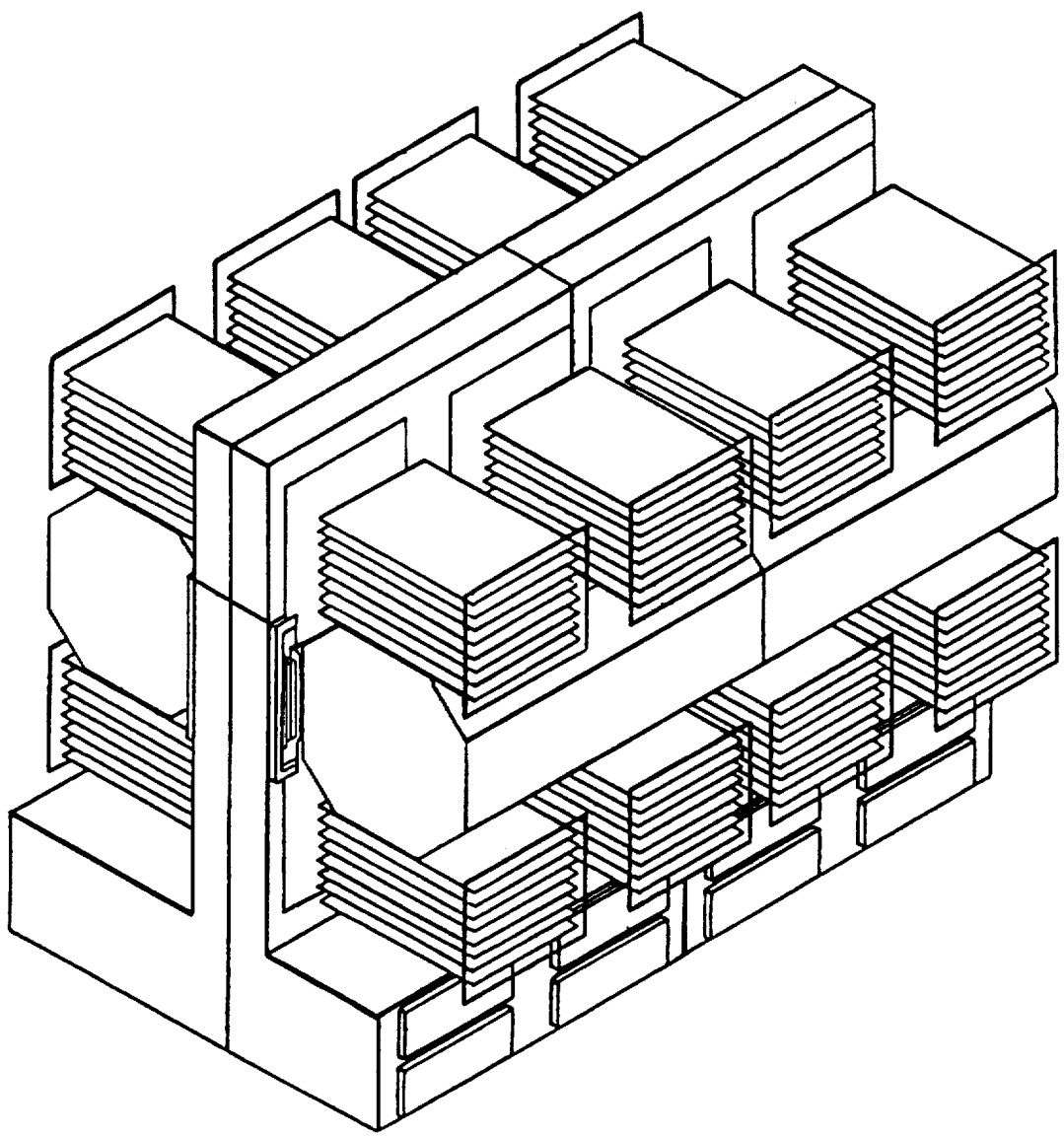
FIG. 45 is an isometric view of a fully populated SMS assembly.

Referring now to FIGS. 44 and 45, the preferred embodiment of the secondary memory storage system (SMS) 30 will be described.

FIG. 44 shows the modular packaging of memory cards 401 and driver cards 402. Sixteen of these air cooled, horizontally mounted DRAM memory cards in two groups 401 are controlled by a vertically mounted flourocarbon cooled SMS driver cards 402.

FIG. 45 shows the placement of memory 401 and driver cards 402 both on the front and the back of the SMS chassis. This provides a noninterference air path across the memory cards. Note that the air cooling system is a pull air system with the blower drawing air across the cards.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. An apparatus for packaging circuitry means for a computer processing system, said apparatus comprising:
    a first substrate and a second substrate spaced apart from said first substrate, said first and second substrates each comprising a generally planar structure including:
        a first substrate area having a plurality of circuitry elements and a plurality of backplane external interconnections operably connected to said first substrate area and means for providing a plurality of signal paths to and from said circuitry elements and to and from said backplane external interconnections; and
        a second substrate area having a plurality of circuitry elements operably connected to said second substrate area and means for providing a plurality of signal paths to and from said circuitry elements; and
    transformation board means intersecting said first and second substrates for providing a plurality of signal paths for connecting said signal paths between said first and second substrate areas and between said first and second substrates, such that the intersection of said transformation board means with said first and second substrates defines a planar boundary between said first and second substrate area on each of said first and second substrates and the only connections to and from said circuitry elements on said second substrate areas are via said signal paths on said transformation board means to said signal paths and said backplane external interconnections on said first substrate areas.

2. A modular brick for packaging a portion of a plurality of circuitry means for a computer processing system, said brick comprising:

switching circuit means for controlling the routing of signals to and from said brick operably connected to a plurality of spaced apart first substrates:

functional circuit means for performing functional operations operably connected to a plurality of spaced apart second substrates, each of said second substrates being associated with one of said first substrates: and transformation board means intersecting each of said plurality of first and second substrates for providing a plurality of signal paths to interconnect said switching circuit means and said functional circuit means.

3. The modular brick of claim 2 wherein said switching circuit means comprises an arbitration node and said functional circuit means comprises two or more scalar/vector processors.

4. The modular brick of claim 2 wherein said switching circuit means comprises an arbitration network and said functional circuit means comprises a memory section.

5. A packaging architecture for a multiprocessor cluster for a highly parallel computer processing system, said multiprocessor cluster comprising shared resource means for storing and retrieving data and control information, a plurality of processors capable of parallel processing, and one or more arbitration node means operably connected to said processors and said shared resource means for symmetrically interconnecting said processors with said shared resource means, said packaging architecture comprising:

a plurality of modular brick means for packaging a portion of electronic circuitry for said computer processing system, each brick means comprising:

switching circuit means for controlling the routing of signals to and from said brick means operably connected to a plurality of spaced apart first substrates;

functional circuit means for performing functional operations operably connected to a plurality of spaced apart second substrates, each of said second substrates being associated with one of said first substrates; and transformation board means intersecting each of said plurality of first and second substrates for providing a plurality of signal paths to interconnect said switching circuit means and said functional circuit means; and a plurality of columns, each column comprised of two or more of said brick means operably connected together.

6. The packaging architecture of claim 5 wherein said brick means in one or more specified columns contain said switching circuit means and said functional circuit means associated with said processors and said arbitration node means and said brick means in one or more different columns contain said switching circuit means and said functional circuit means associated with said shared resource means.

7. The packaging architecture of claim 6 wherein there are two processor columns associated with said processors and said arbitration node means and four memory columns associated with said shared resource means, each of said processor columns comprised of four brick means each having two arbitration node means and four processors and each of said memory columns comprised of six brick means.

8. The packaging architecture of claim 7 wherein said processor columns and said memory columns are vertically oriented and arranged together in a generally rectangular horizontal cross-section with one of said memory columns positioned at each corner of said rectangular cross-section and said processor columns positioned between said memory columns along parallel sides of said rectangular cross-section.

9. The packaging architecture of claim 7 wherein two or more of said multiprocessor clusters may be operably connected together, each multiprocessor cluster further comprising remote cluster adapter means operably connected to remote cluster access means in all other clusters for allowing said arbitration node means to access said shared resource means of all other clusters and for allowing all of said other remote cluster access means of all other clusters to access said shared resource means of this cluster, said packaging architecture further comprising at least one modular brick means in one of said processor columns containing said switching circuit means and said functional circuit means associated with said remote cluster access means.

10. The packaging architecture of claim 7 wherein at least one of said processor columns further comprises a modular brick means containing said switching circuit means and said functional circuit means associated with a scan path unit for collecting and processing diagnostic information provided by all of said other modular brick means in said multiprocessor cluster.

11. The packaging architecture of claim 7 further comprising means for providing power to said multiprocessor cluster located above and below said processor columns and said memory columns and having a horizontal crosssection similar to said rectangular cross-section.

12. The packaging architecture of claim 7 further comprising means for providing a liquid coolant to said processor columns and said memory columns.

13. The packaging architecture of claim 12 wherein said means for providing a liquid coolant includes a plurality of impingement plates interspaced within said modular brick means for impinging said liquid coolant on said switching circuit means and said functional circuit means.

* * * * *

UNITED STATES PATENT AND TRADEMARK OFFICE
CERTIFICATE OF CORRECTION

PATENT NO. : 5,251,097

DATED : October 5, 1993

INVENTOR(S) : Frederick J. Simmons et al.

It is certified that error appears in the above-indentified patent and that said Letters Patent is hereby corrected as shown below:

Column 5, Line 68, please delete "15b a" and insert --15b are a-- therefor.

Column 6, Line 12, please delete "21c" and insert --21a-- therefor.

Column 7, Line 38, please delete "10b)," and insert --10b,-- therefor.

Column 9, Line 6, please delete "shovm" and insert --shown-- therefor.

Column 11, Line 44, please delete "(NMCA)," and insert --(MRCA),-- therefor.

Column 12, Line 4, please delete "wig" and insert --will-- therefor.

Column 12, Line 12, please delete "320 1/0" and insert --320 I/0-- therefor.

Column 12, Line 59, please delete "showm" and insert --shown-- therefor.

Column 13, Line 16, please delete "No. 07,xxx,xxx." and insert --No. 07/536,270.-- therefor.

UNITED STATES PATENT AND TRADEMARK OFFICE
CERTIFICATE OF CORRECTION

PATENT NO. : 5,251,097

DATED : October 5, 1993

INVENTOR(S) : Frederick J. Simmons, et. al.

It is certified that error appears in the above-indentified patent and that said Letters Patent is hereby corrected as shown below:

Column 16, line 24, please delete "comer" and insert -- corner--therefor

Signed and Sealed this

Thirtieth Day of July, 1996

Attest:

BRUCE LEHMAN

Attesting Officer

Commissioner of Patents and Trademarks